(12) United States Patent
Yoon

(10) Patent No.: US 10,541,394 B2
(45) Date of Patent: Jan. 21, 2020

(54) BATTERY MOUNTING ASSEMBLY AND BATTERY REPLACEMENT SYSTEM

(71) Applicant: HANWHA DEFENSE CO., LTD., Changwon-si (KR)

(72) Inventor: Seokhoon Yoon, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 198 days.

(21) Appl. No.: 15/555,606

(22) PCT Filed: May 6, 2015

(86) PCT No.: PCT/KR2015/004501
§ 371 (c)(1),
(2) Date: Sep. 5, 2017

(87) PCT Pub. No.: WO2016/140397
PCT Pub. Date: Sep. 9, 2016

(65) Prior Publication Data
US 2018/0047955 A1 Feb. 15, 2018

(30) Foreign Application Priority Data

Mar. 4, 2015 (KR) .......................... 10-2015-0030544

(51) Int. Cl.
H01M 10/46 (2006.01)
H01M 2/10 (2006.01)
H01M 10/42 (2006.01)

(52) U.S. Cl.
CPC .......... *H01M 2/1066* (2013.01); *H01M 10/42* (2013.01); *H01M 10/46* (2013.01); *H01M 2220/30* (2013.01)

(58) Field of Classification Search
CPC ..... H01M 2/1066; H01M 10/42; H01M 10/48
See application file for complete search history.

(56) References Cited

U.S. PATENT DOCUMENTS 6,346,793 B1 * 2/2002 Shibata ................. H02J 7/0042
320/107
6,926,994 B2 * 8/2005 Cox ........................ H01M 2/10
429/99
(Continued)

FOREIGN PATENT DOCUMENTS

KR 10-0562673 B1 3/2006
KR 1020060096830 A 9/2006
(Continued)

OTHER PUBLICATIONS

Communication dated Mar. 28, 2019 issued by the Korean Intellectual Property Office in counterpart Korean Application No. 10-2015-0030544.

*Primary Examiner* — Olatunji A Godo
(74) *Attorney, Agent, or Firm* — Sughrue Mion, PLLC

(57) ABSTRACT

Provided is a battery mounting assembly including a battery portion, and a battery mounting portion on which the battery portion slides to be mounted, wherein the battery portion includes: a first guide configured to guide a sliding movement of the battery portion; a first connection terminal arranged on a surface of the battery portion; a fixing pin arranged on the battery portion; and a fixing pin retreat button configured to retreat the fixing pin, wherein the battery mounting portion includes: a second guide configured to guide the sliding movement of the battery portion; a second connection terminal arranged on a surface of the battery mounting portion and connected to the first connection terminal; and a fixing hole formed in the surface of the battery mounting portion and into which the fixing pin is inserted.

27 Claims, 19 Drawing Sheets

(56) References Cited

U.S. PATENT DOCUMENTS 9,312,523 B2 4/2016 Choi et al.
2006/0220611 A1 10/2006 Choi
2012/0018237 A1* 1/2012 Kovach ............... H01M 2/1083
180/68.5

FOREIGN PATENT DOCUMENTS

KR 1020060100891 A 9/2006
KR 1020140018163 A 2/2014
KR 10-1392975 B1 5/2014

* cited by examiner

BATTERY MOUNTING ASSEMBLY AND BATTERY REPLACEMENT SYSTEM

TECHNICAL FIELD

The present disclosure relates to a battery mounting assembly and a battery replacement system, and more particularly, to a battery mounting assembly and a battery replacement system capable of replacing a battery while maintaining power supply to a power supply target device.

BACKGROUND ART

As devices operating by using electric power increase, usage of batteries has also increased. Recently, as mobile devices such as mobile phones, robot vacuum cleaners, etc. have been widely used, batteries storing electric power have been emphasized.

Since there is a limitation in storage capacity of a battery, a battery mounted in a device has to be charged or replaced before or after the battery is discharged. Since it takes a predetermined time period to charge a battery, the battery may be replaced if the device has to be used immediately.

In general, when a battery is replaced, power supply from the battery is stopped, and thus, the device is also turned off. In this case, when the device is turned on after replacing the battery, the device has to reboot if the device requires a rebooting operation, and then, the device may not be used for the time period taken to perform the rebooting, and operating efficiency degrades.

Korean Patent Publication No. 2004-0026515 discloses a portable wireless terminal having a locking device allowing a battery pack to be detached.

DETAILED DESCRIPTION OF THE INVENTIVE CONCEPT

Technical Problem

According to an aspect of the present disclosure, a battery mounting assembly and a battery replacement system capable of easily replacing a battery while maintaining power supply to a device are provided.

Technical Solution

According to an aspect of the present disclosure, there is provided a battery mounting assembly comprising: a battery portion; and a battery mounting portion on which the battery portion is mounted as sliding thereto, wherein the battery portion comprises: a first guide configured to guide a sliding movement of the battery portion; a first connection terminal arranged on a surface among surfaces of the battery portion, the surface facing the battery mounting portion; a fixing pin arranged on the battery portion and provided to proceed and retreat to/from the surface of the battery portion facing the battery mounting portion; and a fixing pin retreat button configured to retreat the fixing pin when the fixing pin retreat button is pushed in a sliding direction of the battery portion, wherein the battery mounting portion comprises: a second guide configured to guide the sliding movement of the battery portion with the first guide; a second connection terminal arranged on a surface among surfaces of the battery mounting portion, the surface facing the battery portion, and connected to the first connection terminal; and a fixing hole formed in the surface of the battery mounting portion facing the battery portion, and into which the fixing pin is inserted.

According to an aspect of the present disclosure, there is provided a battery replacement system comprising: a battery portion; a battery mounting portion provided on a moving object, and on which the battery portion is mounted as sliding thereto; a battery supporter arranged at an outer portion of the moving object and supporting the battery portion; and a battery charger configured to charge the battery portion supported by the battery supporter.

Advantageous Effects

According to a battery mounting assembly and a battery replacement system of the present disclosure, power supply may be maintained while replacing a battery and a battery replacement operation may be easily performed.

BEST MODE

Figure 1:
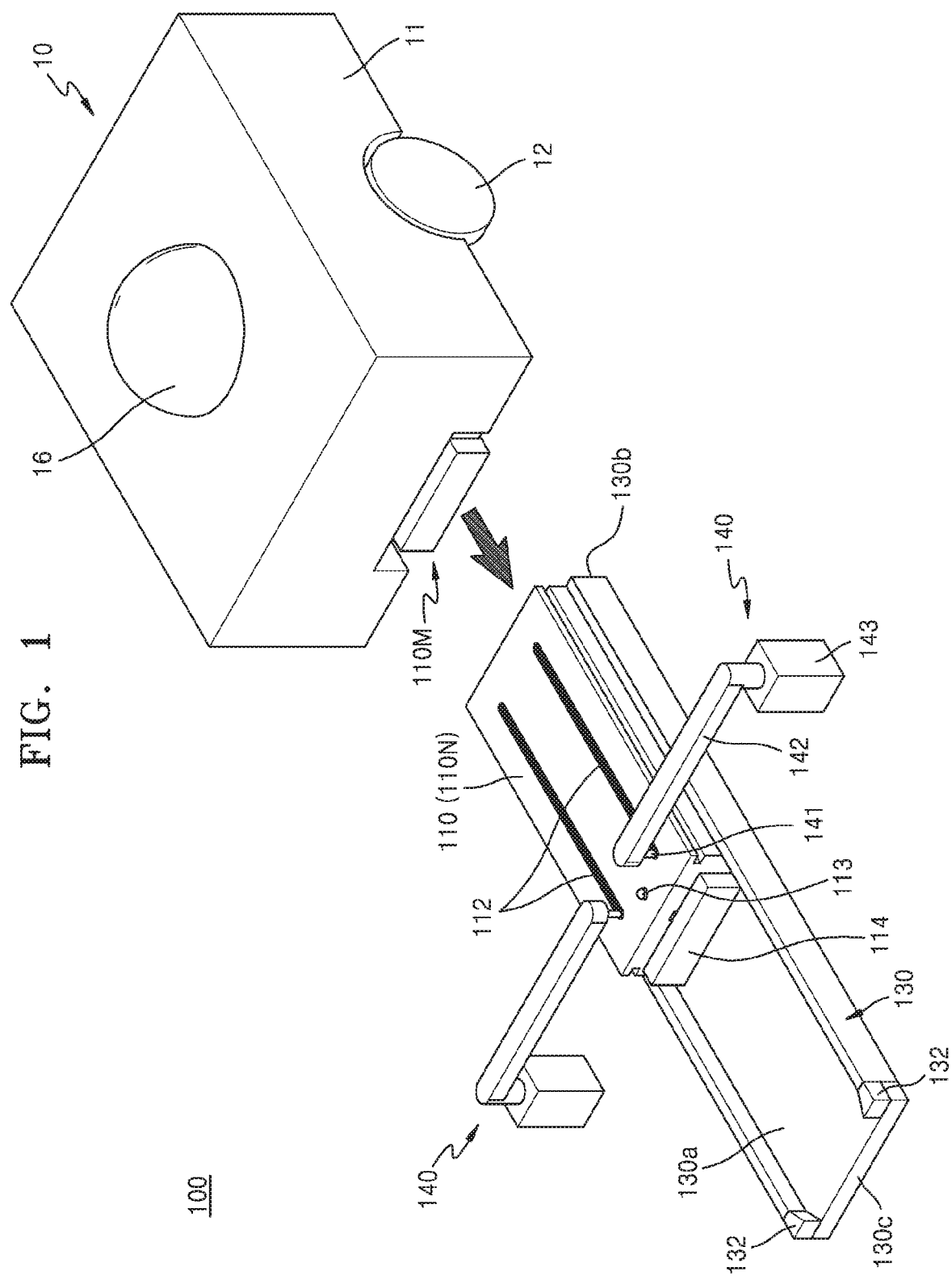
FIG. 1 is a schematic perspective view of a battery replacement system according to an embodiment of the present disclosure.

According to an aspect of the present disclosure, there is provided a battery mounting assembly comprising: a battery portion; and a battery mounting portion on which the battery portion is mounted as sliding thereto, wherein the battery portion comprises: a first guide configured to guide a sliding movement of the battery portion; a first connection terminal arranged on a surface among surfaces of the battery portion, the surface facing the battery mounting portion; a fixing pin arranged on the battery portion and provided to proceed and retreat to/from the surface of the battery portion facing the battery mounting portion; and a fixing pin retreat button configured to retreat the fixing pin when the fixing pin retreat button is pushed in a sliding direction of the battery portion, wherein the battery mounting portion comprises: a second guide configured to guide the sliding movement of the battery portion with the first guide; a second connection terminal arranged on a surface among surfaces of the battery mounting portion, the surface facing the battery portion, and connected to the first connection terminal; and a fixing hole formed in the surface of the battery mounting portion facing the battery portion, and into which the fixing pin is inserted.

The first connection terminal may extend in the sliding direction of the battery portion, and the second connection terminal may be arranged in the sliding direction of the battery portion with a predetermined interval.

The second connection terminal may be elastically supported.

The first connection terminal may be arranged in the sliding direction of the battery portion with a predetermined interval, and the second connection terminal may extend in the sliding direction of the battery portion.

The first connection terminal may be elastically supported.

The fixing pin and the fixing pin retreat button may be connected via a cam device.

The cam device may comprise: a driving member connected to the fixing pin retreat button and including a cam recess; a driven member connected to the fixing pin and including a protrusion inserted into the cam recess; and an elastic member connected to the driving member and applying an elastic force to the fixing pin retreat button.

The first connection terminal and the second connection terminal may be arranged to maintain electric connection between the first connection terminal and the second connection terminal during replacement of the battery portion.

The fixing pin may have a first inclined surface at an end portion thereof.

The battery mounting portion may have a second inclined surface at a part where the battery portion enters while sliding.

According to an aspect of the present disclosure, there is provided a battery replacement system comprising: a battery portion; a battery mounting portion provided on a moving object, and on which the battery portion is mounted as sliding thereto, a battery supporter arranged at an outer portion of the moving object and supporting the battery portion; and a battery charger configured to charge the battery portion supported by the battery supporter.

The battery portion may comprise: a first guide configured to guide a sliding movement of the battery portion; a first connection terminal arranged on a surface of the battery portion, wherein the surface faces the battery mounting portion; a fixing pin arranged on the battery and provided to proceed and retreat to/from the surface of the battery portion facing the battery mounting portion; and a fixing pin retreat button configured to retreat the fixing pin when the fixing pin retreat button is pushed in a sliding direction of the battery portion, wherein the battery mounting portion comprises: a second guide configured to guide the sliding movement of the battery portion with the first guide; a second connection terminal arranged on a surface of the battery mounting portion, wherein the surface faces the battery portion, and connected to the first connection terminal; and a fixing hole formed in the surface of the battery mounting portion, wherein the surface faces the battery portion, so that the fixing pin is inserted thereto.

The first connection terminal may extend in the sliding direction of the battery portion, and the second connection terminal may be arranged in the sliding direction of the battery portion with a predetermined interval.

The second connection terminal may be elastically supported.

The first connection terminal may be arranged in the sliding direction of the battery portion with a predetermined interval, and the second connection terminal may extend in the sliding direction of the battery portion.

The first connection terminal may be elastically supported.

The fixing pin and the fixing pin retreat button may be connected via a cam device.

The cam device may comprise: a driving member connected to the fixing pin retreat button and including a cam recess; a driven member connected to the fixing pin and including a protrusion inserted to the cam recess; an elastic member connected to the driving member and applying an elastic force to the fixing pin retreat button.

The first connection terminal and the second connection terminal may be arranged so that electric connection between the first connection terminal and the second connection terminal is maintained while the battery portion is replaced.

The fixing pin may have a first inclined surface at an end portion thereof.

The battery mounting portion may have a second inclined surface at a part where the battery portion enters while sliding.

The battery charger may comprise: a charging terminal connected to the first connection terminal of the battery portion; an arm portion configured to support the charging terminal; and an arm supporter configured to support the arm portion to be rotatable.

The battery charger may further comprise an elastic portion elastically supporting the arm portion in a rotating direction with respect to the arm supporter.

The battery portion may be arranged on the battery supporter while sliding, and the battery supporter may comprise a third guide configured to guide the sliding movement of the battery portion.

The battery portion may be arranged on the battery supporter while sliding, and the battery supporter may comprise a motion stopper provided at a side thereof for restricting the sliding movement of the battery portion.

MODE OF THE INVENTION

Hereinafter, one or more embodiments of the present disclosure will be described in detail with reference to accompanying drawings. Also, in the present specification and drawings, like reference numerals denote substantially the same components and detailed descriptions thereof are not repeated.

Figure 2:
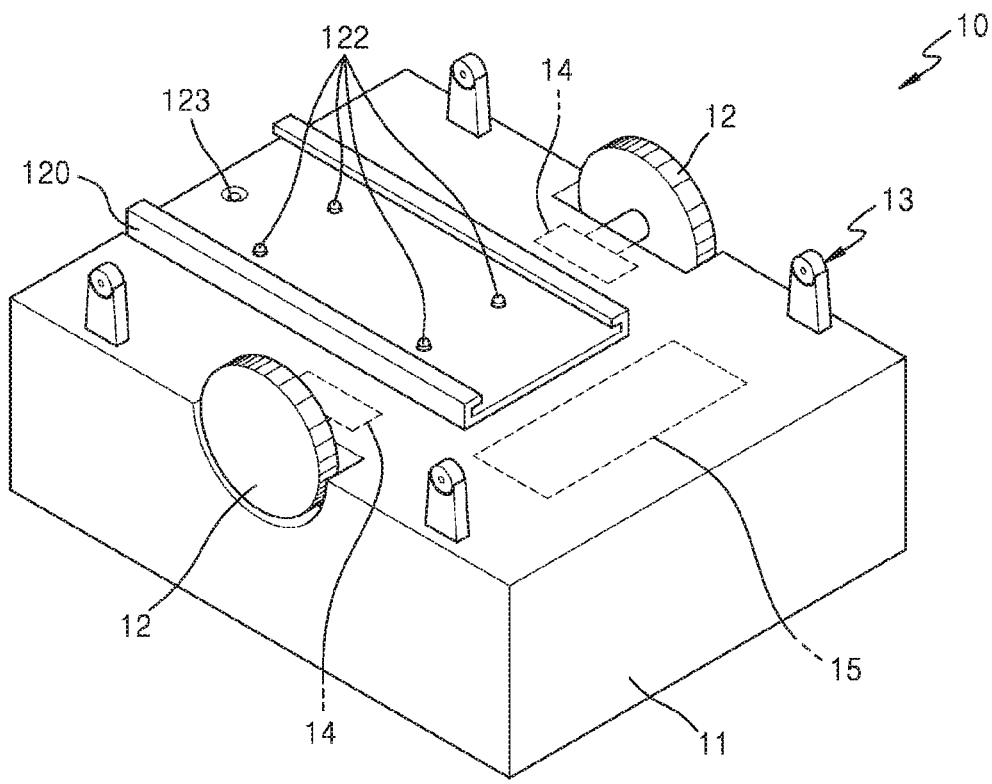
FIG. 2 is a schematic perspective view of a bottom surface of a moving object according to an embodiment of the present disclosure, where a battery portion is not mounted for convenience of description.

FIG. 1 is a schematic perspective view of a battery replacement system according to an embodiment of the present disclosure, and FIG. 2 is a schematic perspective view of a bottom surface of a moving object according to an embodiment of the present disclosure, wherein a battery portion is not mounted for convenience of description.

Figure 9:
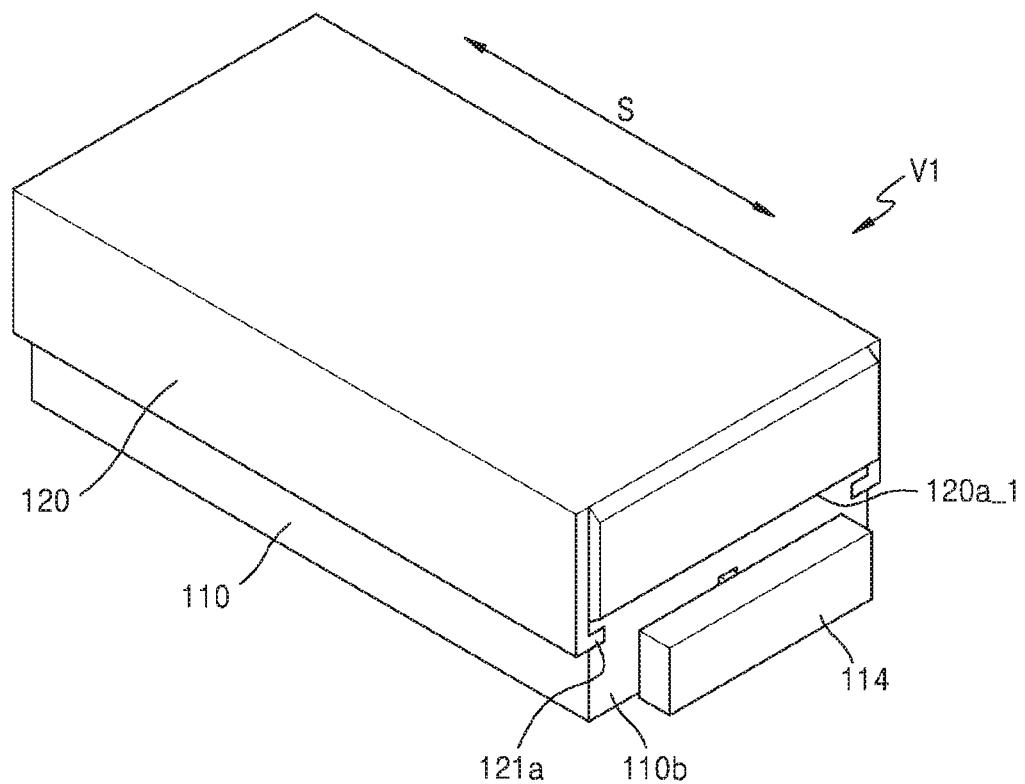
FIG. 9 is a schematic perspective view of a battery mounting assembly, in which a battery portion is mounted on a battery mounting portion, according to an embodiment of the present disclosure.

As shown in FIG. 1, a battery replacement system 100 according to the present embodiment includes a battery portion 110, a battery mounting portion 120, a battery supporter 130, and a battery charger 140, and the battery portion 110 slides towards the battery mounting portion 120 to be mounted in order to form a battery mounting assembly V1 (see FIG. 9).

First, a structure of a moving object 10 in which the battery mounting portion 120 is provided will be described below. As shown in FIGS. 1 and 2, the moving object 10 in which the battery mounting portion 120 is provided includes a body 11, a moving wheel 12, a supporting wheel 13, a driving device 14, a control device 15, and a sensor device 16. The battery mounting portion 120 is provided on a bottom surface of the body 11.

The moving wheel 12 receives a driving power from the driving device 14 to move the moving object 10, and the supporting wheel 13 supports the body 11 for balancing and allowing the moving object to easily move.

The driving device 14 may include a power device such as a motor and a power transmission device such as a gear, and operates according to control of the control device 15.

The control device 15 is a device for processing peripheral information recognized by the sensor device 16, input information input by a user, etc. to control operations of the driving device 14, and may include an electrical circuit board, an integrated circuit chip, a computer program, etc.

The sensor device 16 may recognize information around the moving object 10 and transmit the information to the control device 15, and may include various sensors such as a camera, lidar, radar, an optical sensor, an acoustic sensor, etc.

The moving object 10 described above may be applied to various apparatuses, and a module having various functions may be provided according to a kind of the apparatus to which the moving object 10 is applied. For example, when the moving object 10 is applied to a robot vacuum cleaner, a cleaning module may be mounted on the body 11 to perform a cleaning operation. In addition, when the moving object 10 is a guard robot, a security camera module, an armed module, etc. may be mounted on the body 11 to perform a guard operation.

Also, the moving object 10 according to the present embodiment has a configuration of implementing an autonomous driving by using the control device 15 and the sensor device 16, but the present disclosure is not limited thereto. For example, the moving object according to the present disclosure may be implemented as a manual driving device that is manually operated by a user, and in this case, the moving object may not include the control device 15 and the sensor device 16.

Hereinafter, a structure of the battery replacement system 100 will be described below.

As shown in FIGS. 3 to 6B, the battery portion 110 includes a first guide 111, a first connection terminal 112, a fixing pin 113, a fixing pin retreat button 114, and a cam device 115.

Figure 3:
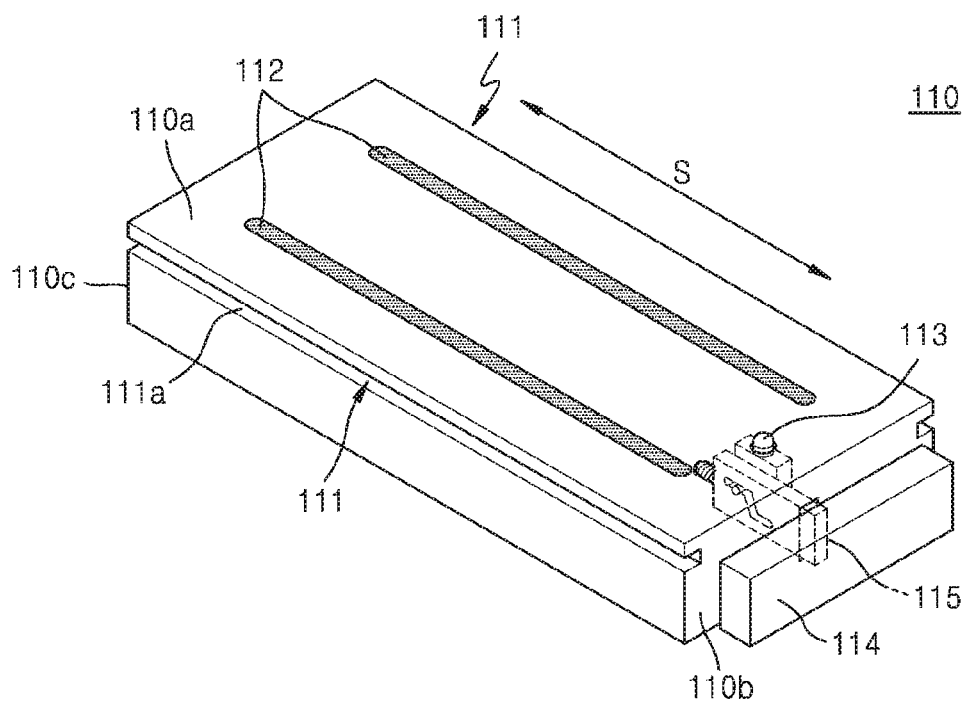
FIG. 3 is a schematic perspective view of a battery portion in a battery replacement system according to an embodiment of the present disclosure.
Figure 4:
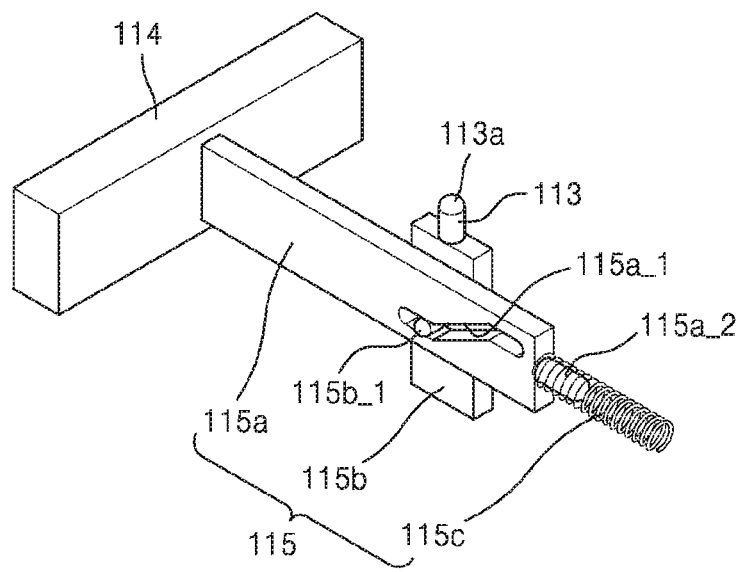
FIG. 4 is a schematic perspective view showing a fixing pin and a fixing pin retreat button connected to each other via a cam device of the battery portion according to an embodiment of the present disclosure.
Figure 5A:
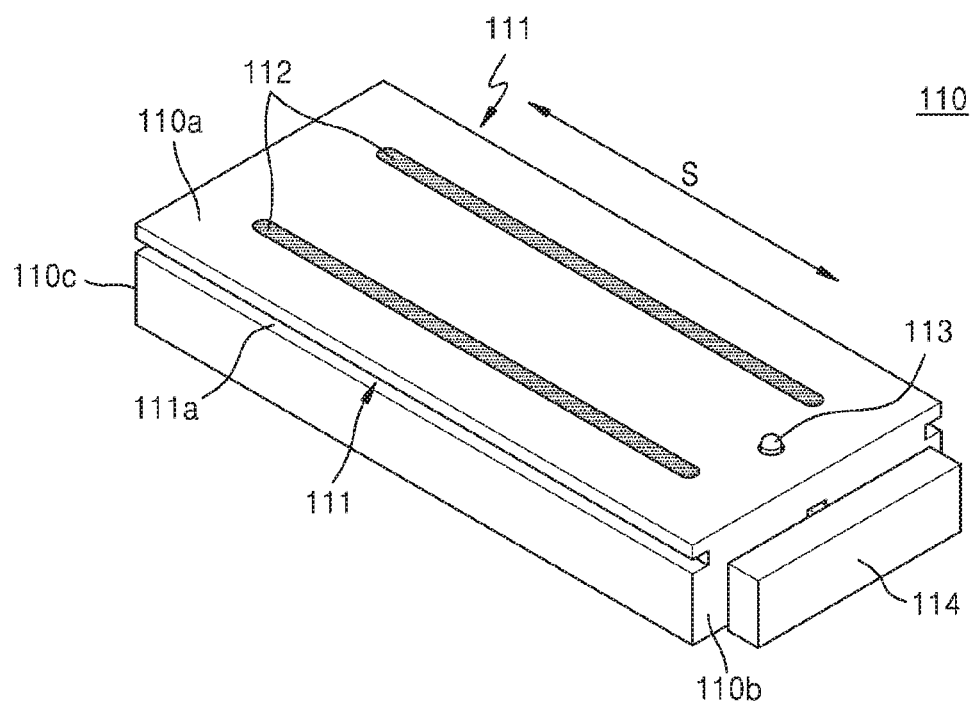
FIG. 5A is a schematic perspective view showing a fixing pin of a battery portion, which proceeds to protrude, according to an embodiment of the present disclosure.
Figure 5B:
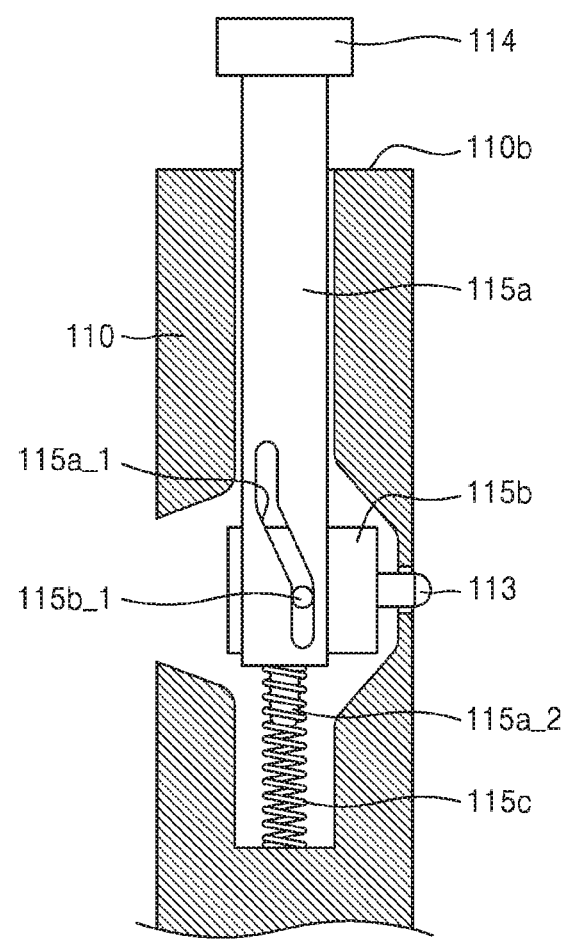
FIG. 5B is a schematic diagram of a fixing pin, a fixing pin retreat button, and a cam device when the fixing pin of the battery portion is protruding according to an embodiment of the present disclosure.
Figure 6A:
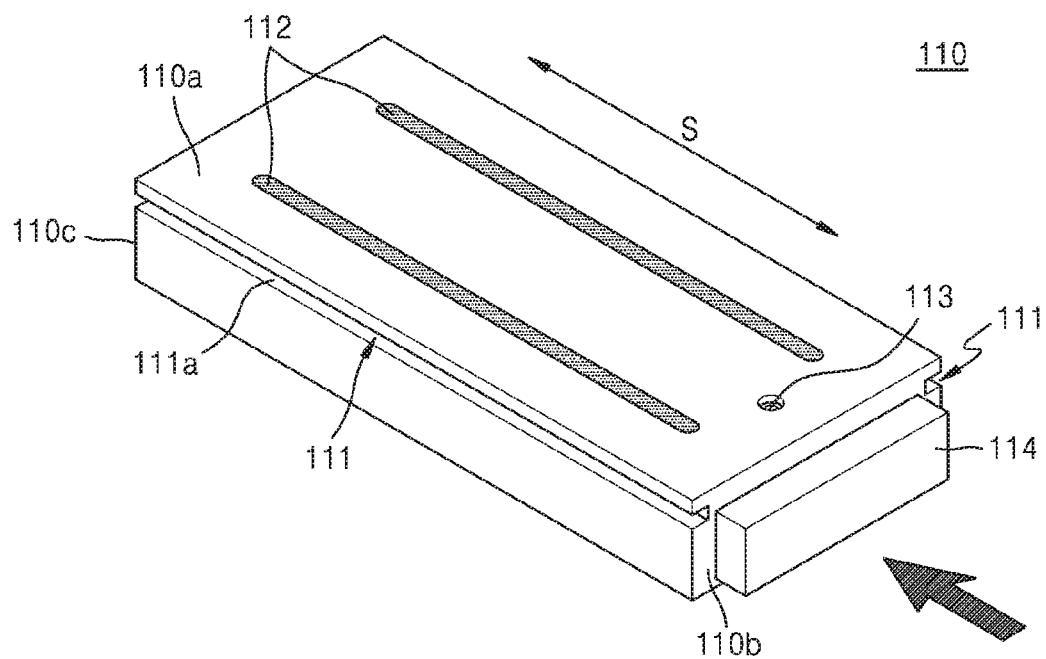
FIG. 6A is a schematic perspective view showing a state in which a fixing pin of a battery portion is retreated according to an embodiment of the present disclosure.
Figure 6B:
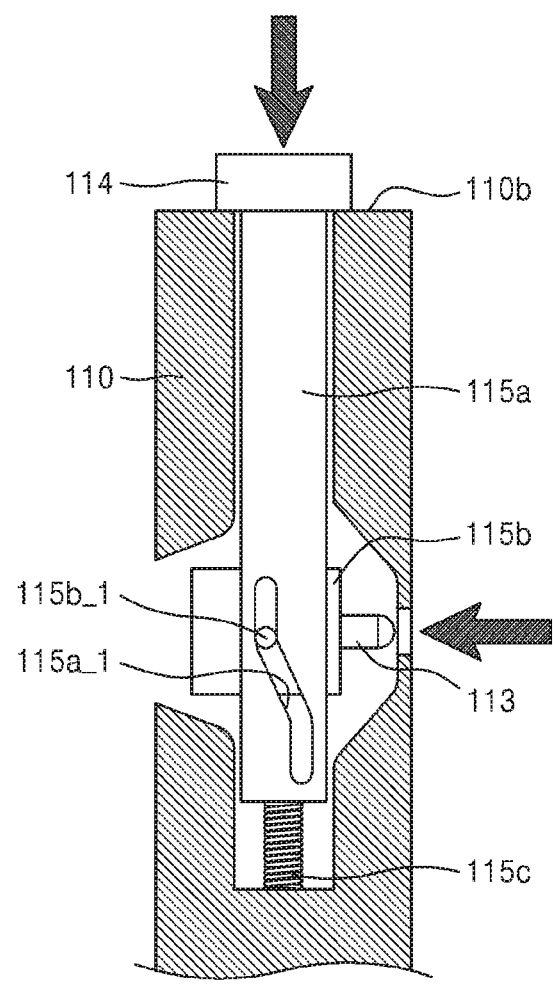
FIG. 6B is a schematic diagram of a fixing pin, a fixing pin retreat button, and a cam device when the fixing pin retreat button is pushed to retreat the fixing pin of the battery portion, according to an embodiment of the present disclosure.

FIG. 3 is a schematic perspective view of a battery portion in the battery mounting assembly according to an embodiment of the present disclosure, and FIG. 4 is a schematic perspective view showing a state in which the fixing pin and the fixing pin retreat button are installed in connection with each other via the cam device according to an embodiment of the present disclosure. Also, FIG. 5A is a schematic perspective view showing the fixing pin of the battery portion, wherein the fixing pin proceeds to protrude, FIG. 5B is a schematic diagram showing the fixing pin, the fixing pin retreat button, and the cam device when the fixing pin of the battery portion protrudes, FIG. 6A is a schematic perspective view of the fixing pin of the battery portion according to the embodiment of the present disclosure, wherein the fixing pin retreats, and FIG. 6B is a schematic diagram of the fixing pin, the fixing pin retreat button, and the cam device when the fixing pin retreat button of the battery portion is pushed to retreat the fixing pin according to the embodiment of the present disclosure.

The first guide 111 guides sliding movement of the battery portion 110. The first guides 111 are arranged at opposite sides of the battery portion 110, and each of the first guides 111 includes groove 111a extending in a sliding direction S in which the battery portion 110 slides.

The first connection terminal 112 is provided on an upper surface from among surfaces of the battery portion 110, that is, a surface 110a facing the battery mounting portion 120.

The first connection terminal 112 extends in the sliding direction S of the battery portion 110. The first connection terminal 112 is arranged in two rows that are in parallel with each other, and when a supplied power is a direct current (DC) power, the two rows function as a positive electrode and a negative electrode.

The first connection terminal 112 includes an electrically conductive material, and the first connection terminal 112 is arranged to a sufficient length so that the electric connection to a second connection terminal 122 may be maintained even when the battery portion 110 is replaced, as will be described later.

In addition, the fixing pin 113 is provided to proceed and retreat to/from the upper surface of the battery portion 110, that is, the surface 110a facing the battery mounting portion 120.

As shown in FIG. 4, an end portion of the fixing pin 113 has a first inclined surface 113a, and the first inclined surface 113a contacts a second inclined surface 120a_1 of the battery mounting portion 120 while mounting the battery portion 110 and then the fixing pin 113 is pushed to retreat, and accordingly, the fixing pin 113 may not be hooked by the battery mounting portion 120 when the battery portion 110 slides on the battery mounting portion 120.

In addition, the fixing pin retreat button 114 is provided so that the fixing pin 113 may be retreated when the fixing pin retreat button 114 is pushed in the sliding direction S. To do this, the fixing pin retreat button 114 is provided on a surface 110b of the battery portion 110, wherein the surface 110b is substantially perpendicular to the sliding direction S of the battery portion 110, and the fixing pin 113 and the fixing pin retreat button 114 are connected to each other via the cam device 115.

The cam device 115 is connected to the fixing pin 113 and the fixing pin retreat button 114, so as to allow the fixing pin 113 to retreat when the fixing pin retreat button 114 is pushed.

As shown in FIG. 4, the cam device 115 includes a driving member 115a, a driven member 115b, and an elastic member 115c.

The driving member 115a is connected to the fixing pin retreat button 114, and includes a cam recess 115a_1 in a part thereof and an elastic member supporter 115a_2 at an end portion thereof.

The driven member 115b is connected to the fixing pin 113, and includes a protrusion 115b_1 inserted to the cam recess 115a_1 of the driving member 115a.

The elastic member 115c is connected to the elastic member supporter 115a_2 of the driving member 115a, and applies elastic force to the fixing pin retreat button 114 so that the fixing pin retreat button 114 may protrude.

The battery portion 110 according to the present embodiment includes the cam device 115, but the present disclosure is not limited thereto. That is, the battery portion 110 according to the present disclosure may not include the cam device 115. In this case, another type of device that may allow the fixing pin 113 to retreat when the fixing pin retreat button 114 is pushed may be applied, for example, a mechanical device other than the cam device, an electronic device including a motor, a pneumatic or hydraulic device, etc. may be applied.

Hereinafter, referring to FIGS. 5A to 6B, interactions among the fixing pin 113, the fixing pin retreat button 114, and the cam device 115 of the battery portion 110 according to the present embodiment will be described below.

FIGS. 5A and 5B show a state in which the fixing pin 113 of the battery portion 110 proceeds and protrudes. In this case, the fixing pin retreat button 114 is protruding due to the elastic force of the elastic member 115c.

In order to replace the battery portion 110, when the fixing pin retreat button 114 is pushed in the sliding direction S of the battery portion 110 as shown in FIG. 6A, the driving member 115a descends as shown in FIG. 6B, and when the driving member 115a descends, the protrusion 115b_1 inserted to the recess 115a_1 of the driving member 115a is moved to the left. Then, the driven member 115b also moves to the left, and the fixing pin 113 is retreated. At this time, since the elastic member 115c is pushed, the elastic member 115c stores elastic energy.

After that, pushing of the fixing pin retreat button 114 is released, the driving member 115a elevates by the elastic member 115c storing the elastic energy, and the protrusion 115b_1 inserted to the recess 115a_1 of the driving member 115a is moved to the right side. Then, the driven member 115b also moves to the right side and the fixing pin 113 proceeds forward, and then, the state as shown in FIGS. 5A and 5B may be obtained.

In addition, the battery mounting portion 120 is provided at a bottom surface of the moving object 10, and this will be described below with reference to FIGS. 7 and 8.

Figure 7:
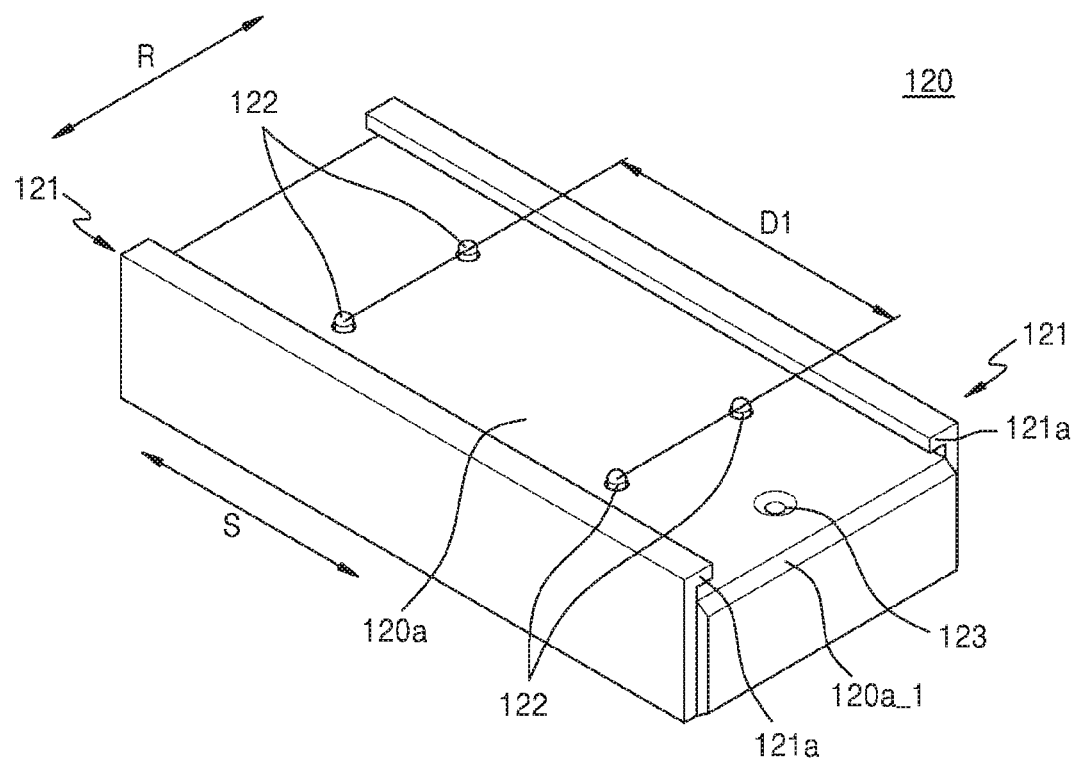
FIG. 7 is a schematic perspective view of a battery mounting portion according to an embodiment of the present disclosure, wherein a bottom surface of the battery mounting portion is turned over.
Figure 8:
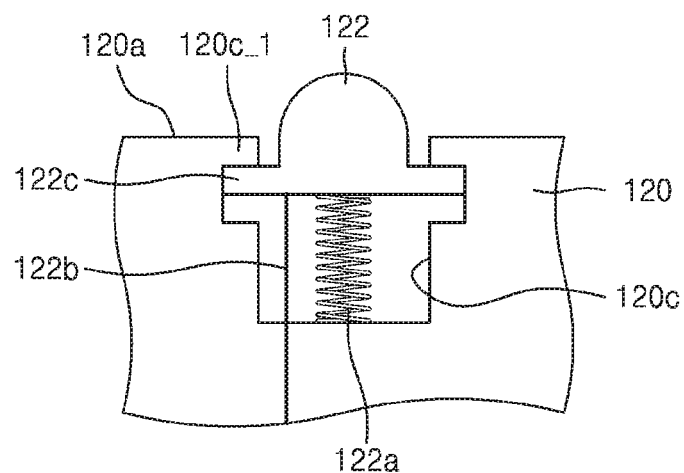
FIG. 8 is a schematic diagram showing a state in which a second connection terminal of a battery mounting portion is arranged.

FIG. 7 is a schematic perspective view of the battery mounting portion, in a state where the bottom surface is turned over, according to an embodiment of the present disclosure, and FIG. 8 is a schematic diagram showing a state in which a second connection terminal of the battery mounting portion is provided according to an embodiment of the present disclosure.

As shown in FIG. 7, the battery mounting portion 120 includes a second guide 121, the second connection terminal 122, and a fixing hole 123.

The second guide 121 guides the sliding movement of the battery portion 110 together with the first guide 111. The second guides 121 are arranged at opposite sides of the battery mounting portion 120 and each of the second guides 121 includes guide flange 121a extending in the sliding direction S of the battery portion 110.

The guide flanges 121a are inserted to the grooves 111a of the first guide 111 to guide the sliding movement of the battery portion 110 while mounting or isolating the battery portion 110.

In addition, the second connection terminal 122 is provided on a surface 120a of the battery mounting portion 120, wherein the surface 120a faces the battery portion 110, and is connected to the first connection terminal 112 of the battery portion 110.

The second connection terminal 122 is arranged in the sliding direction S of the battery portion 110 and a direction R perpendicular to the sliding direction with a predetermined interval. According to the present embodiment, four second connection terminals 122 are arranged, and if the supplied power is DC power, two connection terminals 122 arranged in the sliding direction S function as positive electrodes and the other two connection terminals 122 function as negative electrodes. The second connection terminals 122 are respectively connected to corresponding first connection terminals 112.

The second connection terminal 122 is provided to be elastically supported, and hereinafter, the installation of the second connection terminal 122 will be described below with reference to FIG. 8.

The second connection terminal 122 is accommodated in a terminal receiving recess 120c of the battery mounting portion 120, and includes an elastic portion 122a for elastic support, an electric connector 122b for electrically connecting to a target device of power supply, and a separation preventing portion 122c for preventing separation.

Here, the second connection terminal 122 is configured so that the electric force is applied upward by the elastic portion 122a, and the separation preventing portion 122c is configured to be hooked by a hook portion 120c_1 of the terminal receiving recess 120c so as not to be separated.

The second connection terminal 122 includes an electrically conductive material, and is arranged so that the electric connection to the first connection terminal 112 may be maintained while replacing the battery portion 110. That is, a pair of the second connection terminals 122 are arranged in the sliding direction S as spaced a predetermined distance D1 from another pair of the second connection terminals 122, and as described above, the first connection terminals 112 extend in the sliding direction S. Thus, the electric connection between the second connection terminal 122 and the first connection terminal 112 may be maintained while replacing the battery portion 110.

The second connection terminal 122 according to the present embodiment is accommodated in the terminal receiving recess 120c of the battery mounting portion 120, and includes the elastic portion 122a for elastic support, the electric connector 122b for the electric connection, and the separation preventing portion 122c for preventing the separation, but the present disclosure is not limited thereto. That is, there is no specific limitation in the detailed configuration of the second connection terminal according to the present disclosure provided that the second connection terminal is electrically connected to the first connection terminal 112.

In addition, the fixing hole 123 is provided in the surface 120a of the battery mounting portion 120, wherein the surface 120a faces the battery portion 110, and the fixing pin 113 is inserted to the fixing hole 123 when the battery portion 110 is mounted.

When the fixing pin 113 is inserted to the fixing hole 123, the battery portion 110 may be stably fixed on the battery mounting portion 120.

Also, the battery mounting portion 120 includes a second inclined surface 120a_1 at a portion where the battery portion 110 slides to enter. The second inclined surface 120a_1 collides into the end portion of the fixing pin 113 when the battery portion 110 enters to be mounted, and at this time, the second inclined surface 120a_1 makes the fixing pin 113 retreat without generating shock and guides the sliding movement of the battery portion 110.

According to the present embodiment, the battery mounting portion 120 includes the second inclined surface 120a_1 at the portion where the battery portion 110 slides to enter, but the present disclosure is not limited thereto. That is, the second inclined surface 120a_1 may not be provided on the battery mounting portion 120 according to the present disclosure. In this case, when the battery portion 110 enters, the fixing pin retreat button 114 of the battery portion 110 may be pushed to prevent the fixing pin 113 and the battery mounting portion 120 from colliding into each other.

According to the present embodiment, the first connection terminal 112 extends in the sliding direction of the battery portion 110, and the second connection terminals 122 are arranged in the sliding direction of the battery portion with a predetermined interval therebetween, but the present disclosure is not limited thereto. That is, according to the present disclosure, shapes, numbers, and arrangements of the first and second connection terminals 112 and 122 are not particularly restricted provided that the electric connection between the first connection terminal 112 and the second connection terminal 122 may be maintained while replacing the battery portion 110. For example, unlike the present embodiment, the first connection terminals 112 may be arranged in the sliding direction of the battery portion 110 with a predetermined interval, and the second connection terminal 122 may extend in the sliding direction of the battery portion 110.

FIG. 9 is a schematic perspective view of the battery portion mounted on the battery mounting portion according to an embodiment of the present disclosure.

As shown in FIG. 9, the battery portion 110 according to the present embodiment is mounted on the battery mounting portion 120 to configure the battery mounting assembly V1, and as described above, the battery portion 110 is mounted on the battery mounting portion 120 as sliding in the sliding direction S.

Hereinafter, an aspect of replacing a battery portion 110M mounted on the battery mounting portion 120 according to the embodiment of the present disclosure with a new battery portion 110N will be described below with reference to FIGS. 10 to 13.

FIGS. 10 to 13 schematically show sequential replacing processes of the battery portion 110M mounted on the battery mounting portion 120 with the new battery portion 110N according to the embodiment of the present disclosure.

Figure 10:
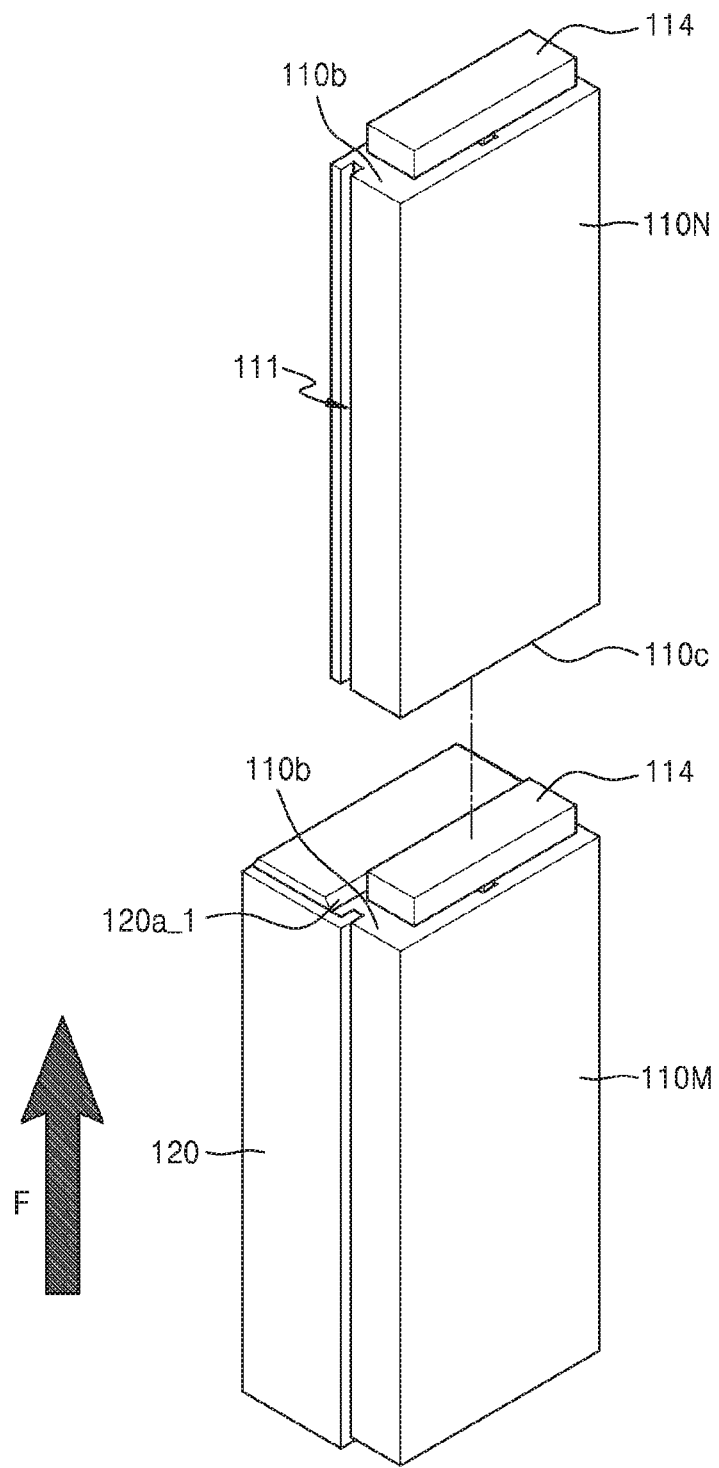
FIGS. 10 to 13 schematically show sequential replacing processes of a battery portion mounted on a battery mounting portion with a new battery portion according to an embodiment of the present disclosure.

First, as shown in FIG. 10, the battery mounting portion 120 is moved so that a surface 110b of the existing battery portion 110M moves towards a surface 110c of the new battery portion 110N. Here, the existing battery portion 110M is in a state of being mounted on the battery mounting portion 120, that is, the movement of the battery portion 110M is restricted by the first guide 111 and the second guide 121, and the fixing pin 113 of the battery portion 110M is fixedly inserted to the fixing hole 123 of the battery mounting portion 120.

Figure 11:
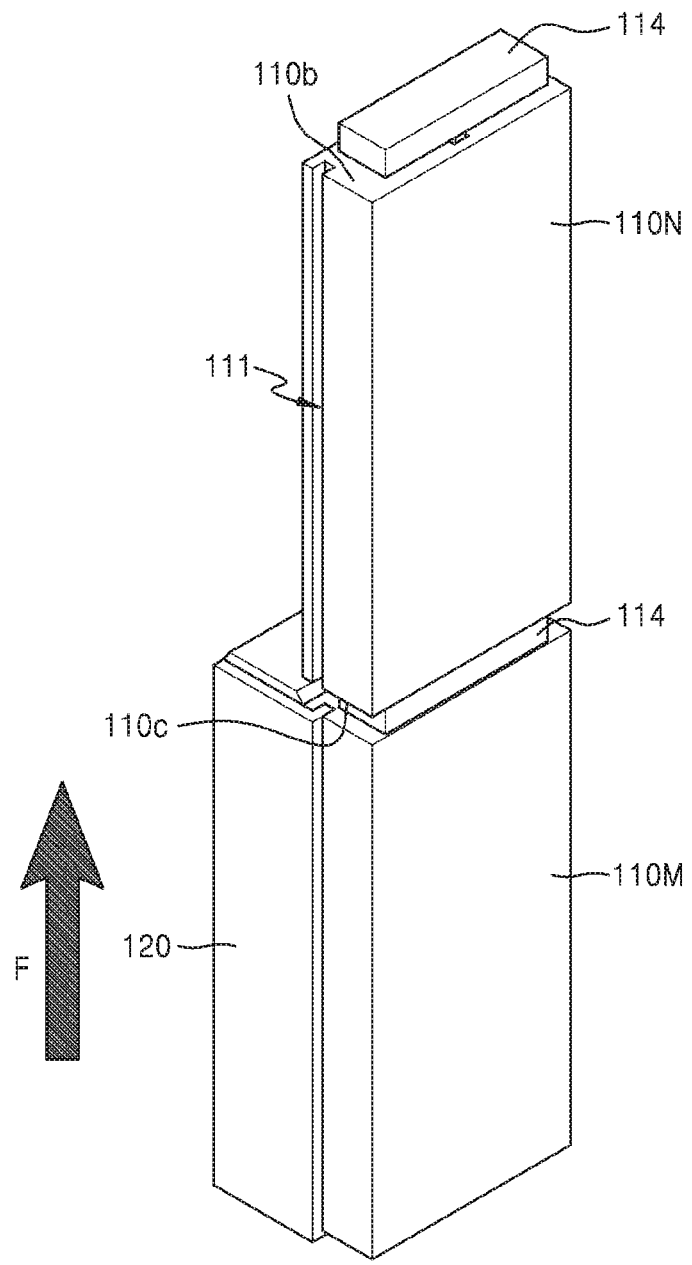

Next, as shown in FIG. 11, the battery mounting portion 120 is further moved upward (arrow F direction), so that the fixing pin retreat button 114 of the existing battery portion 110M is pushed by the surface 110c of the new battery portion 110N. Here, the new battery portion 110N is in a state of being relatively fixed to the battery mounting portion 120. Then, as shown in FIG. 6B, the driving member 115a of the existing battery portion 110M descends, and since the protrusion 115b_1 inserted to the groove 115a_1 of the driving member 115a retreats when the driving member 115a descends, the fixing pin 113 of the battery portion 110M is isolated from the fixing hole 123 of the battery mounting portion 120. Then, the existing battery portion 110M is detachable from the battery mounting portion 120 in the sliding direction.

Figure 12:
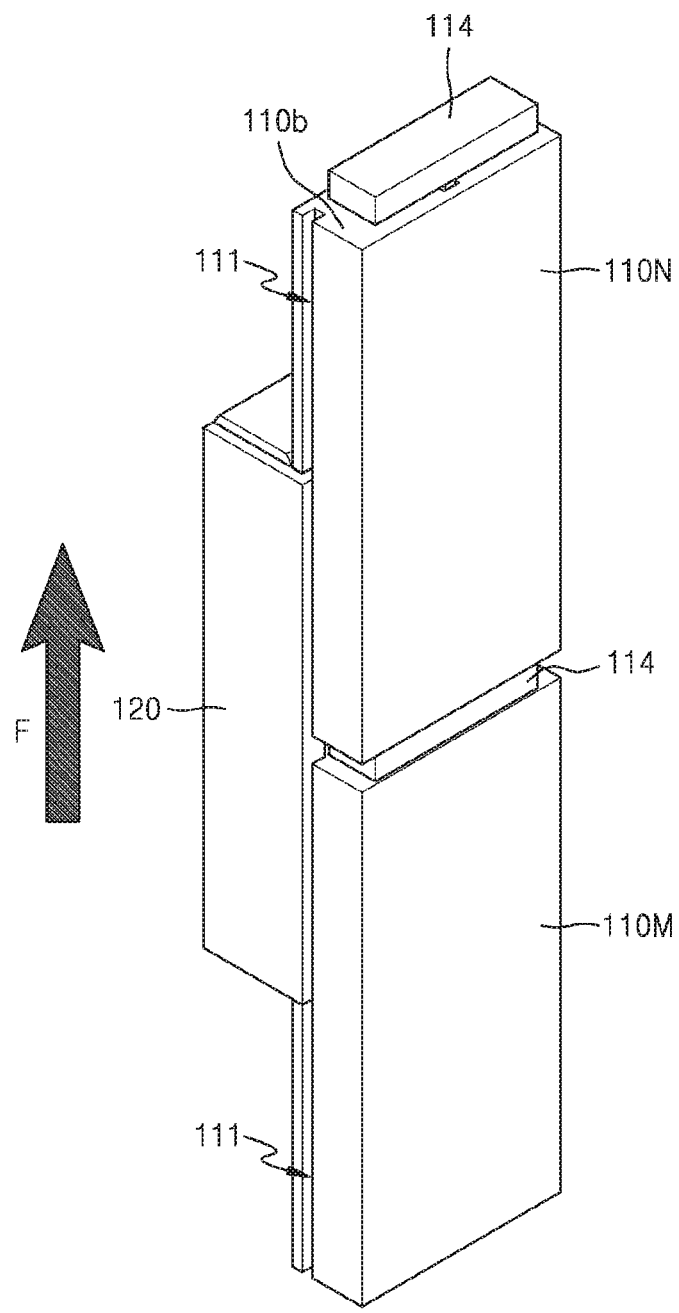

Next, as shown in FIG. 12, when the guide flanges 121a of the second guide 121 of the battery mounting portion 120 is inserted to the grooves 111a of the first guide 111 of the new battery portion 110N and the battery mounting portion 120 is pushed continuously upward (arrow F direction), the battery mounting portion 120 keeps sliding upward (arrow F direction) because the new battery portion 110N is in fixed state. During the sliding movement, the second inclined surface 120a_1 of the battery mounting portion 120 contacts the fixing pin 113 of the new battery portion 110N at a time point. Here, since the fixing pin 113 also has the first inclined surface 113a at the end portion thereof, the external force is applied to the fixing pin 113 without applying the shock so that the fixing pin 113 may retreat, and accordingly, the battery mounting portion 120 may slide without being hooked by the fixing pin 113.

Figure 13:
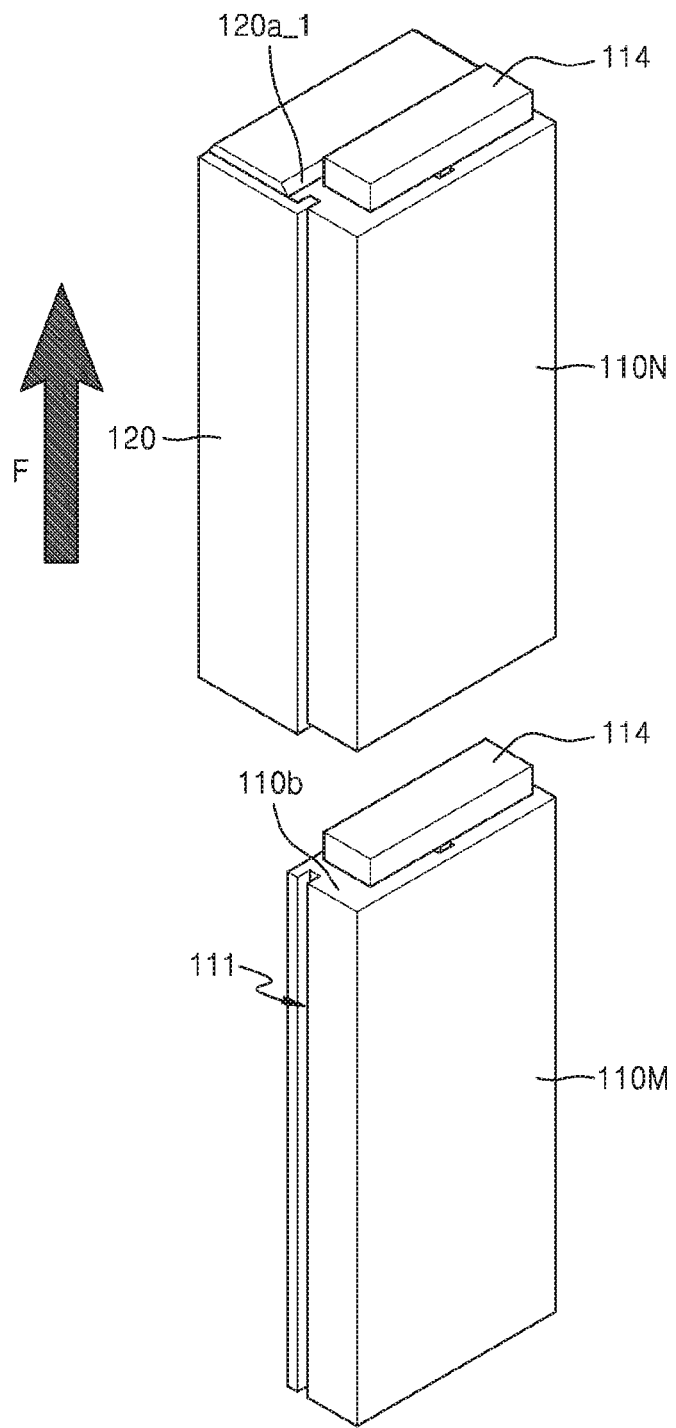

Next, as shown in FIG. 13, the battery mounting portion 120 is further moved upward (arrow F direction) so that the fixing pin 113 of the new battery portion 110N reaches the fixing hole 123 of the battery mounting portion 120, and then, the fixing pin 113 proceeds to be inserted to the fixing hole 123 due to the elastic force of the elastic member 115c. As such, the new battery portion 110N may be stably fixed on the battery mounting portion 120. In addition, the existing battery portion 110M is completely isolated from the battery mounting portion 120, and thus, the replacing operation of the battery portion is finished.

According to the present embodiment, the replacing operation of the battery portion 110 is performed by moving the battery mounting portion 120 in a state where the new battery portion 110N is relatively fixed with respect to the battery mounting portion 120, but the present disclosure is not limited thereto. That is, according to the present disclosure, the replacing operation of the battery portion 110 may be executed by moving the battery portion 110 in a state where the battery mounting portion 120 is relatively fixed with respect to the battery portion 110.

Figure 14:
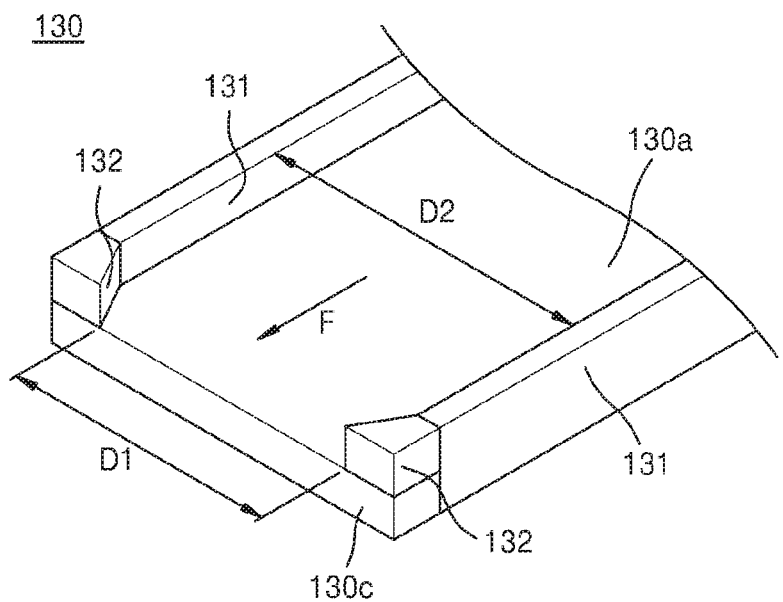
FIG. 14 is a schematic perspective view of a battery supporter in a battery replacement system according to an embodiment of the present disclosure.

In addition, as shown in FIGS. 1 and 14, the battery supporter 130 is arranged on an outer portion of the moving object 10, and supports the battery portion 110 that slides to be arranged.

FIG. 14 is a schematic perspective view of a battery supporter in a battery replacement system according to an embodiment of the present disclosure.

As shown in FIGS. 1 and 14, a third guide 131 guiding the sliding movement of the battery portion 110 is arranged at opposite sides of the battery supporter 130 in a lengthwise direction of the battery supporter 130.

The battery supporter 130 includes a battery entrance 130b and a battery exit 130c, and the battery entrance 130b is a portion where the battery portion 110 enters and the battery exit 130c is a portion through which the battery portion 110 exits.

The battery portion 110 is placed on an upper surface 130a of the battery supporter 130 to be supported, and the battery supporter 130 is appropriately arranged so that a height of the battery portion 110 placed on the upper surface 130a of the battery supporter 130 is equal to a height of the battery portion 110 mounted on the battery mounting portion 120 of the moving object 10. Then, when the moving object 10 on which the battery portion 110 is mounted moves towards the battery supporter 130, the battery portion 110 mounted on the moving object 10 directly pushes and moves the battery portion 110 placed on the upper surface 130a of the battery supporter 130 to execute the replacing operation, which will be described in detail later.

A motion stopper 132 for restricting the sliding movement of the battery portion 110 is provided at the battery exit 130c of the battery supporter 130. The motion stopper 132 may be connected to an end portion of the third guide 131.

The sliding movement of the battery portion 110 on the upper surface 130a of the battery supporter 130 is restricted by the motion stopper 132, so that the movement in an arrow direction (F direction) of FIG. 14 is restricted to a predetermined level. However, if the battery portion 110 is pushed by the force of a predetermined level or greater, the battery portion 110 is moved in the arrow direction (F direction) of FIG. 14 to be isolated from the battery supporter 130.

To do this, a width D1 between motion stoppers 132 may be less than a width D2 between third guides 131, and the motion stopper 132 may include a material that may be elastically deformed. For example, the motion stopper 132 may include a material such as sponge, rubber, fiber, etc. that may be elastically deformed easily.

The motion stopper 132 according to the present embodiment restricts the movement of the battery portion 110 to some degree by using frictional force, but the present disclosure is not limited thereto. That is, the motion stopper according to the present disclosure may use other physical forces than the frictional force. For example, the motion stopper may use magnetic force such as a magnet, an electromagnet, etc., or may be configured as a device using an adhesive force such as an adhesive.

Figure 15:
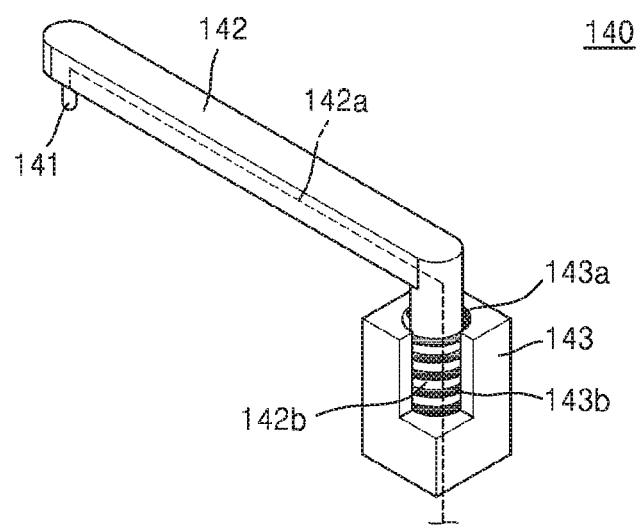
FIG. 15 is a partially cut perspective view schematically showing the battery charger in the battery replacement system according to an embodiment of the present disclosure.

In addition, as shown in FIGS. 1 and 15, the battery charger 140 is a device for charging the battery portion 110 supported by the battery supporter 130.

FIG. 15 is a partially cut perspective view schematically showing the battery charger in the battery replacement system according to an embodiment of the present disclosure.

The battery charger 140 is provided as a pair, each including a charging terminal 141, an arm portion 142, and an arm supporter 143.

The charging terminal 141 is connected to the first connection terminal 112 of the battery portion 110 supported by the battery supporter 130, and includes a material having an excellent electric conductivity such as metal, etc.

The arm portion 142 supports the charging terminal 141, and a wire 142a for electrically connecting to the charging terminal 141 passes in the arm portion 142.

The arm supporter 143 supports the arm portion 142 to be rotatable. To do this, the arm supporter 143 includes a support hole 143a in which an end 142b of the arm portion 142 may be inserted, and an elastic portion 143b elastically supporting the arm portion 142 with respect to the arm supporter 143 in a rotating direction is provided between the end 142b of the arm portion 142 and the arm supporter 143.

According to the present embodiment, a bearing is not provided between the end 142b of the arm portion 142 and the support hole 143a of the arm supporter 143, but the present disclosure is not limited thereto. That is, according to the present disclosure, a bearing may be provided between the end 142b of the arm portion 142 and the support hole 143a of the arm supporter 143 to make the arm portion 142 smoothly rotate.

A charging operation is performed when a user or a controller (not shown) supplies electric power to a pair of battery chargers 140, and the supplied electric power is supplied to the battery portion 110 sequentially through the wire 142a, the charging terminal 141, and the first connection terminal 112 to charge the battery portion 110.

Hereinafter, operations of the battery replacement system 100 according to the present embodiment will be described below with reference to FIG. 1 and FIGS. 16 to 20.

FIGS. 16 to 20 are schematic diagrams sequentially showing aspects of replacing an existing battery portion mounted on the battery mounting portion of the moving object with a new battery portion arranged on the battery supporter in the battery replacement system according to an embodiment of the present disclosure.

In more detail, it will be described according to an order of the battery replacing operations with reference to the drawings illustrating each step of the battery replacing operations.

FIG. 1 shows a state, in which the new battery portion 110N is charged by the battery charger 140 while being placed and supported at the battery entrance side 130b on the upper surface 130a of the battery supporter 130. Also, in FIG. 1, the moving object 10 is approaching the battery supporter 130 for replacing the battery portion 110M that has been previously mounted (hereinafter, moving of the moving object 10 in an arrow direction of FIG. 1 is referred to as [proceed].) Here, the existing battery portion 110M is mounted on the battery mounting portion 120 on the bottom surface of the moving object 10, and the moving object 10 approaches while accurately adjusting the proceeding direction by using the sensor device 160 and the control device 15 in order to match the positions of the existing battery portion 110M and the new battery portion 110N. In the above state, relations among the locations of the existing battery portion 110M, the new battery portion 110N, and the battery mounting portion 120 correspond to the state illustrated in FIG. 10.

Figure 16:
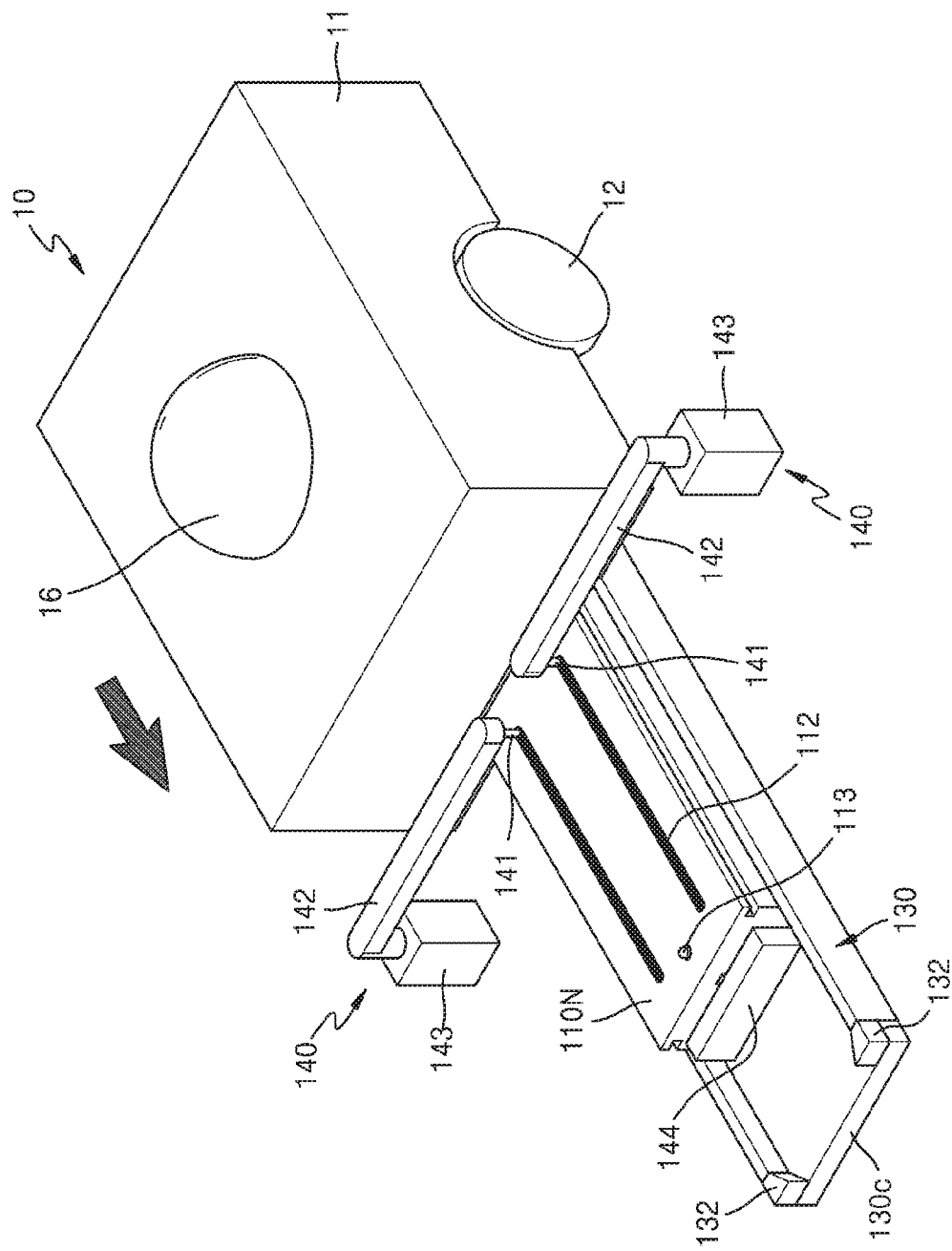
FIGS. 16 to 20 are schematic diagrams sequentially showing aspects of replacing an existing battery portion mounted on a battery mounting portion of a moving object with a new battery portion arranged on a battery supporter according to an embodiment of the present disclosure.

Next, a case in which the moving object 10 further proceeds will be described. In FIG. 16, the moving object 10 proceeds further from the state illustrated in FIG. 1, and the existing battery portion 110M mounted on the battery mounting portion 120 proceeds while pushing the new battery portion 110N. That is, when the moving object 10 proceeds further, the existing battery portion 110M collides with the new battery portion 110N, and then, the new battery portion 110N and the existing battery portion 110M slide along with the third guide 131 of the battery supporter 130. Here, since there is a small frictional force between the battery supporter 130 and the new battery portion 110N, only a small force is applied to the fixing pin retreat button 114 of the existing battery portion 110M contacting the new battery portion 110N. Therefore, although the existing battery portion 110M proceeds while pushing the new battery portion 110N, the elastic member 115c is designed so that the fixing pin retreat button 114 of the existing battery portion 110M may not be completely pushed by the pushing force, and thus, the fixing pin 113 of the existing battery portion 110M is not yet isolated from the fixing hole 123 of the battery mounting portion 120. Therefore, the mounting state of the existing battery portion 110M on the battery mounting portion 120 is still maintained.

Figure 17:
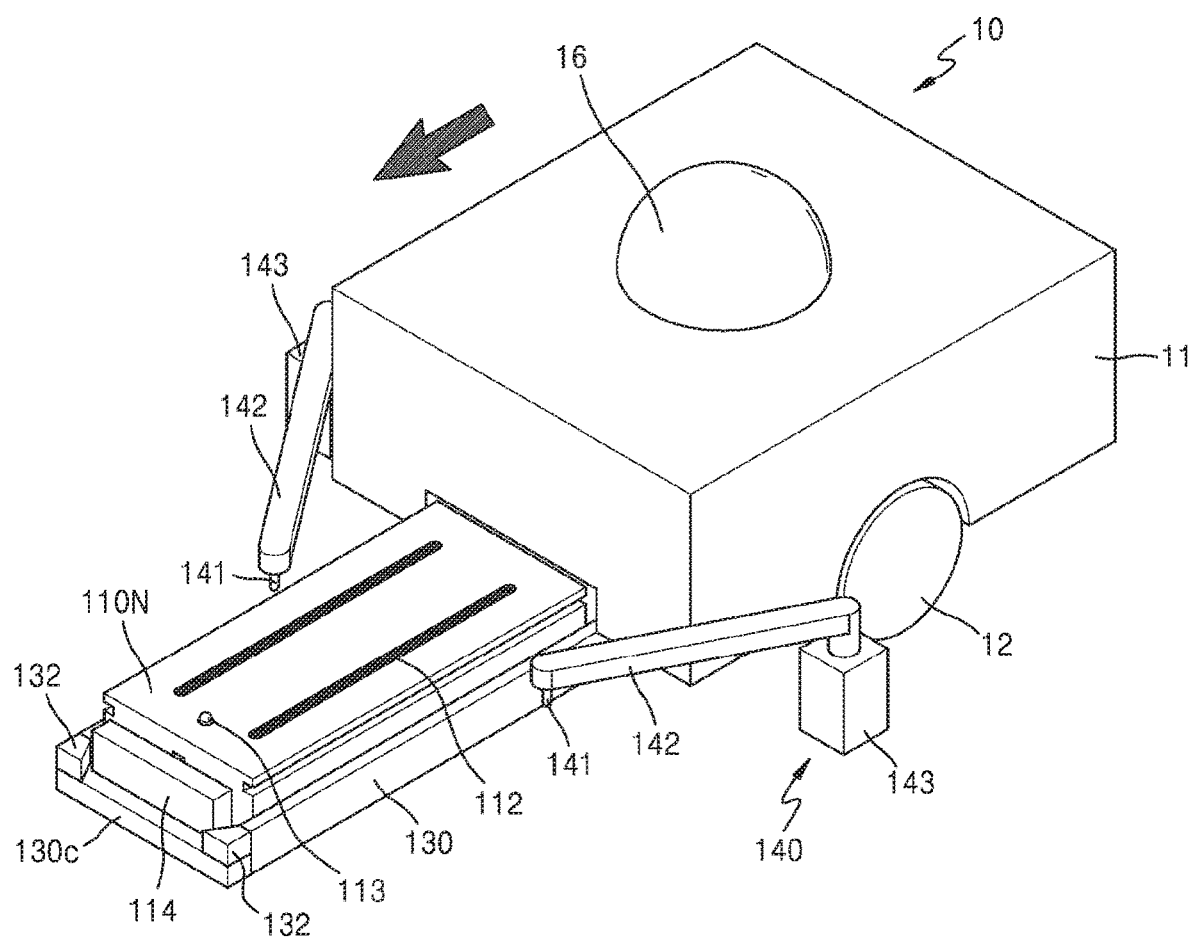

Next, a case in which the moving object 10 further proceeds will be described. In FIG. 17, the moving object 10 proceeds further from the state illustrated in FIG. 16, and then, the new battery portion 110N may not proceed further due to the motion stopper 132. That is, since the new battery portion 110N may not proceed any further unless a force greater than the frictional force of the motion stopper 132 is applied to the new battery portion 110N, the fixing pin retreat button 114 of the existing battery portion 110M that has pushed the new battery portion 110N is completely pushed, and then, the fixing pin 113 of the battery portion 110M is isolated from the fixing hole 123 of the battery mounting portion 120. In the above state, relations among the locations of the existing battery portion 110M, the new battery portion 110N, and the battery mounting portion 120 correspond to the state illustrated in FIG. 11. In addition, the moving object 10 pushes the arm portion 142 of the battery charger 140, and the arm portion 142 pivots about the arm supporter 143. When the arm portion 142 rotates, the elastic portion 143b in the arm supporter 143 stores elastic energy.

Figure 18:
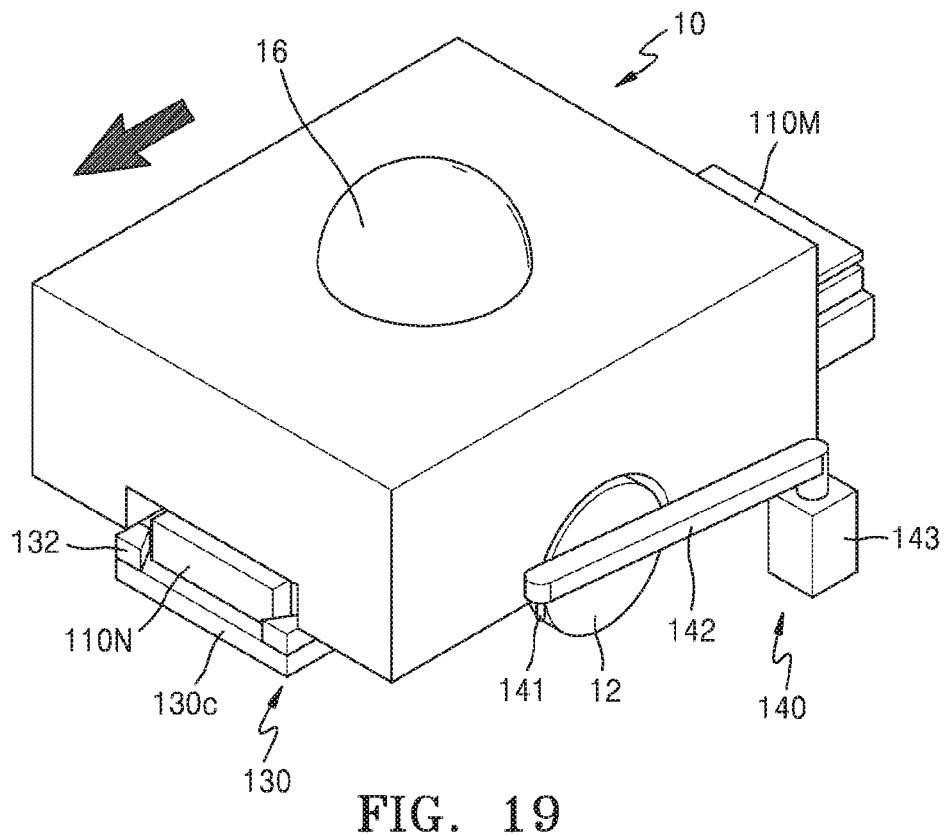

Next, a case in which the moving object 10 further proceeds will be described. FIG. 18 shows a state in which the moving object 10 proceeds further from the state illustrated in FIG. 17, and the battery portion 110M on the battery mounting portion 120 of the moving object 10 is completely replaced with the new battery portion 110N. Here, relations among the positions of the existing battery portion 110M, the new battery portion 110N, and the battery mounting portion 120 correspond to transition from the state of FIG. 12 to the state of FIG. 13. Here, the fixing pin 113 of the new battery portion 110N reaches the fixing hole 123 of the battery mounting portion 120, and then, the fixing pin 113 proceeds due to the elastic force of the elastic member 115c to be inserted to the fixing hole 123. As such, the new battery portion 110N may be stably fixed on the battery mounting portion 120.

Figure 19:
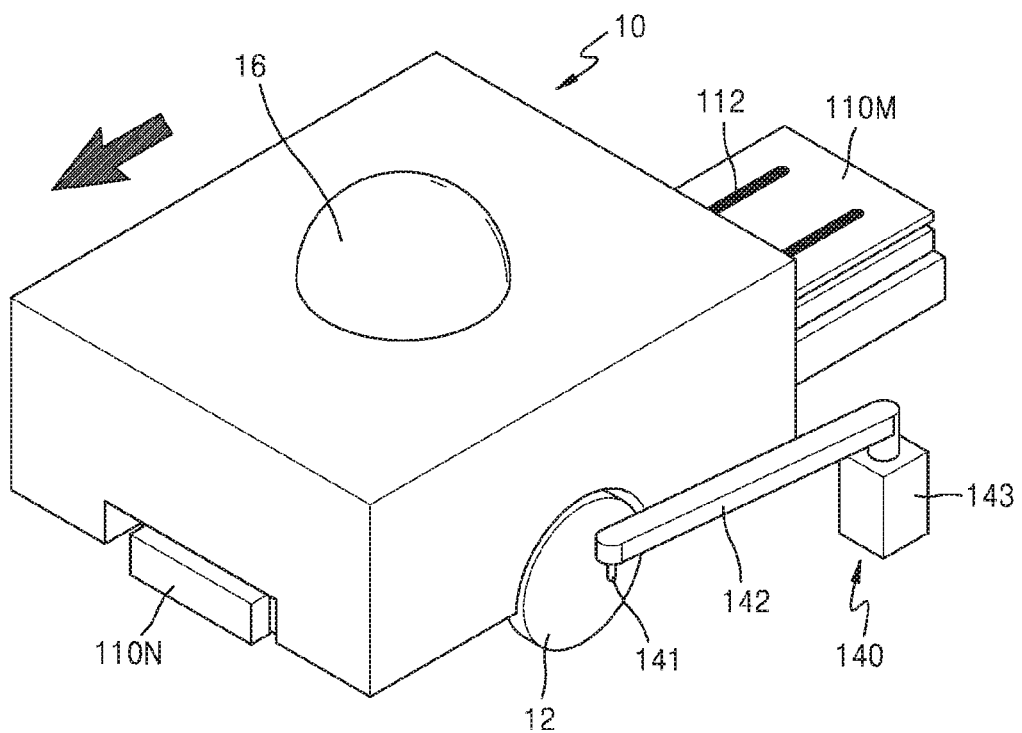

Next, a case in which the moving object 10 further proceeds will be described. FIG. 19 shows the state in which the moving object 10 proceeds further from the state of FIG. 18, and the new battery portion 110N mounted on the battery mounting portion 120 starts to be isolated from the battery supporter 130. Here, since the new battery portion 110N has been stably mounted on the battery mounting portion 120 of the moving object 10 via the fixing pin 113 as described above, the force of the moving object 10 for moving the new battery portion 110N becomes greater than the frictional force of the motion stopper 132, and thus, the new battery portion 110N may be easily isolated from the battery supporter 130.

Figure 20:
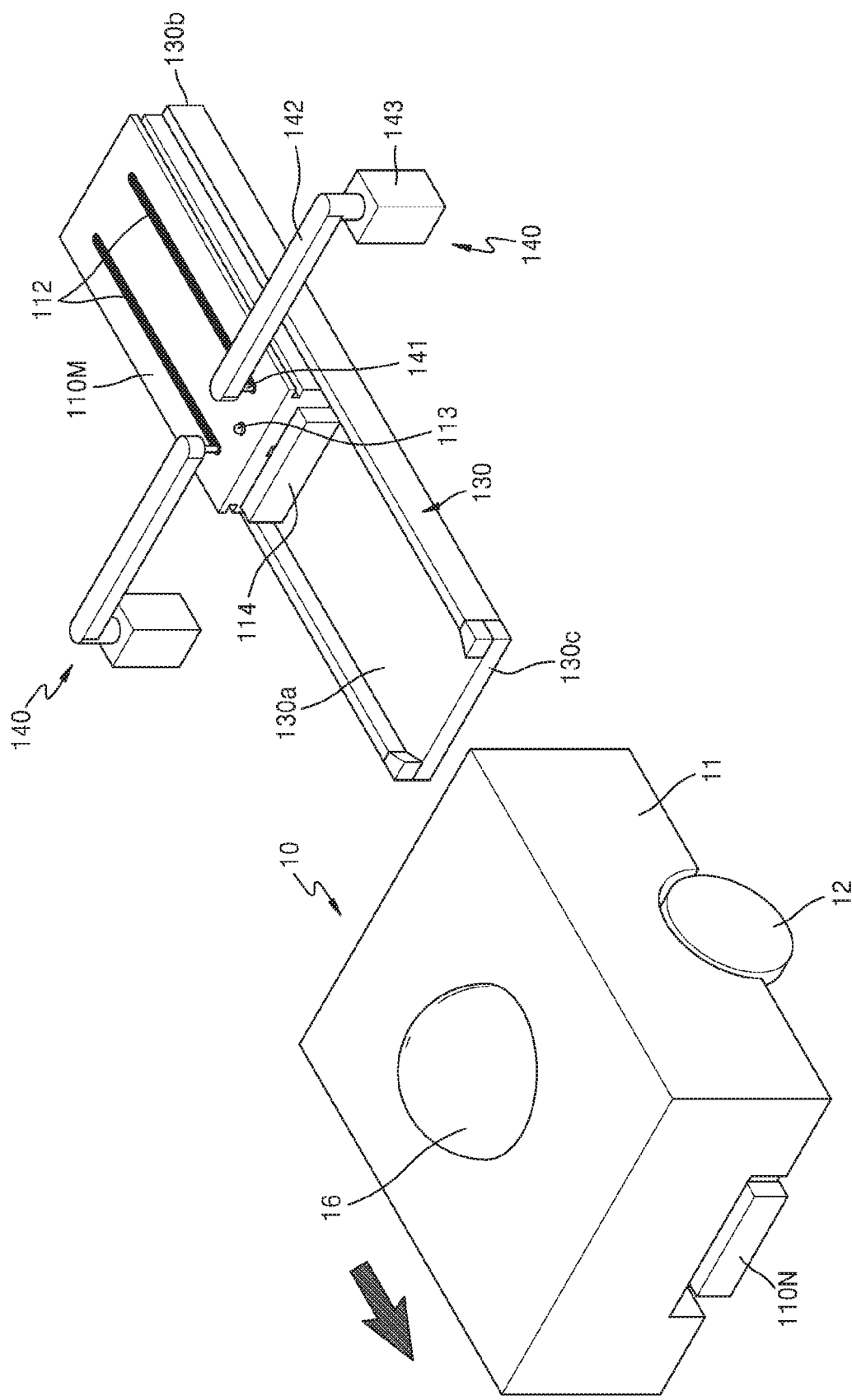

Next, a case in which the moving object 10 further proceeds will be described. FIG. 20 shows a state in which the moving object 10 proceeds further from the state of FIG. 19 and the new battery portion 110N mounted on the battery mounting portion 120 is completely isolated from the battery supporter 130. Here, the arm portion 142 of the battery charger 140 returns to the original position due to the elastic force of the elastic portion 143b, and then, a charging operation of the existing battery portion 100M remaining on the battery supporter 130 starts.

The replacing process of the battery portion 110 as described above may be equally applied to a case when the new battery portion 110N mounted on the battery mounting portion 120 of the moving object 10 is replaced with another new battery portion. That is, when the battery needs to be replaced, the above-described battery replacing process is repeatedly performed.

As described above, the battery replacement system 100 according to the present embodiment may maintain the supply of the electric power even when the battery portion 110 is replaced.

Also, the battery replacement system 100 according to the present embodiment may stably maintain the mounting status of the battery portion 110 on the battery mounting portion 120 due to the fixing pint 113 of the battery portion 110 and the fixing hole 123 of the battery mounting portion 120.

Also, in the battery replacement system 100 according to the present embodiment, the replacing operation of the battery portion 110 may be easily performed and automation of the replacing operation of the battery portion 110 may be executed due to the fixing pin retreat button 114 that operates the fixing pin 113. That is, in order to replace the battery portion 110, the new battery portion 110N simply contacts the existing battery portion 110M, and then, the battery mounting portion 120 is only moved to release the mounting state of the battery portion 110. Thus, the replacing of the battery portion 110 may be easily performed and transition to the automated process may be easily implemented.

Also, in the battery replacement system 100 according to the present embodiment, the replacing of the battery portion 110 is performed by using the battery supporter 130, it is advantageous for automating the battery replacement and the battery portion 110 may be stably replaced.

Also, in the battery replacement system 100 according to the present embodiment, the battery portion 110 to be replaced may be charged by the battery charger 140, and thus, a user does not need to perform the charging operation of the battery portion 110 by using an additional charger, and the battery portion 110 may be automatically charged during the replacing operation of the battery portion 110.

Hereinafter, referring to FIGS. 21 to 23, a battery mounting assembly V2 according to a modified example of the present embodiment will be described, and elements that are different from the previous embodiment will be described below.

Figure 21:
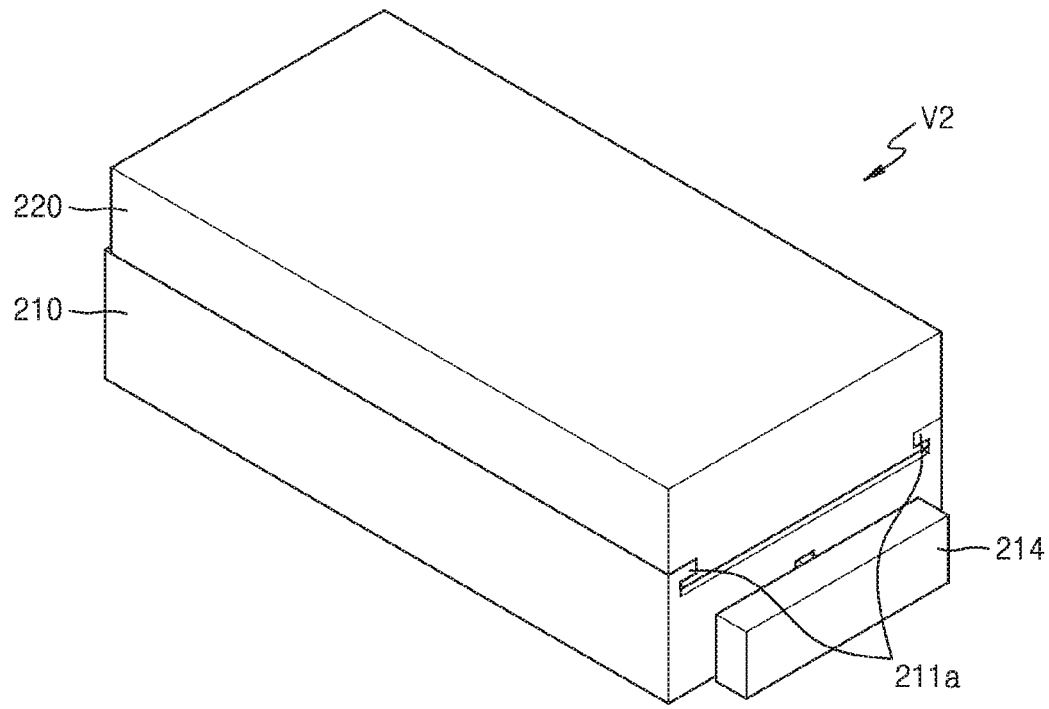
FIG. 21 is a schematic perspective view of a battery mounting assembly, in which a battery portion is mounted on a battery mounting portion, according to a modified example of an embodiment of the present disclosure.
Figure 22:
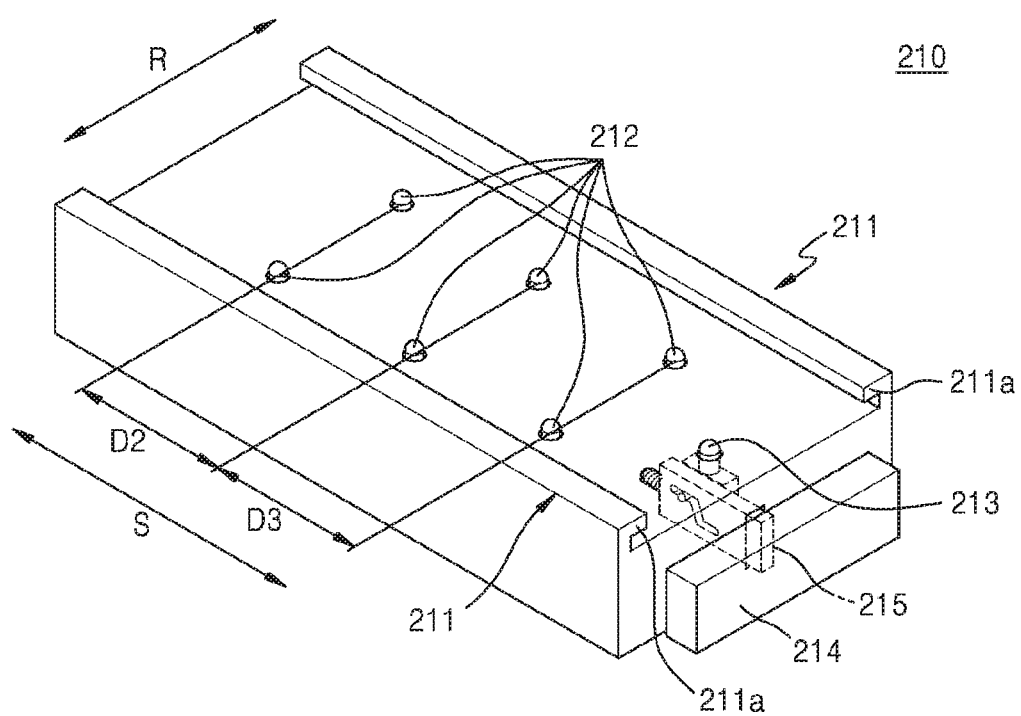
FIG. 22 is a schematic perspective view of a battery portion of a battery mounting assembly according to a modified example of an embodiment of the present disclosure.
Figure 23:
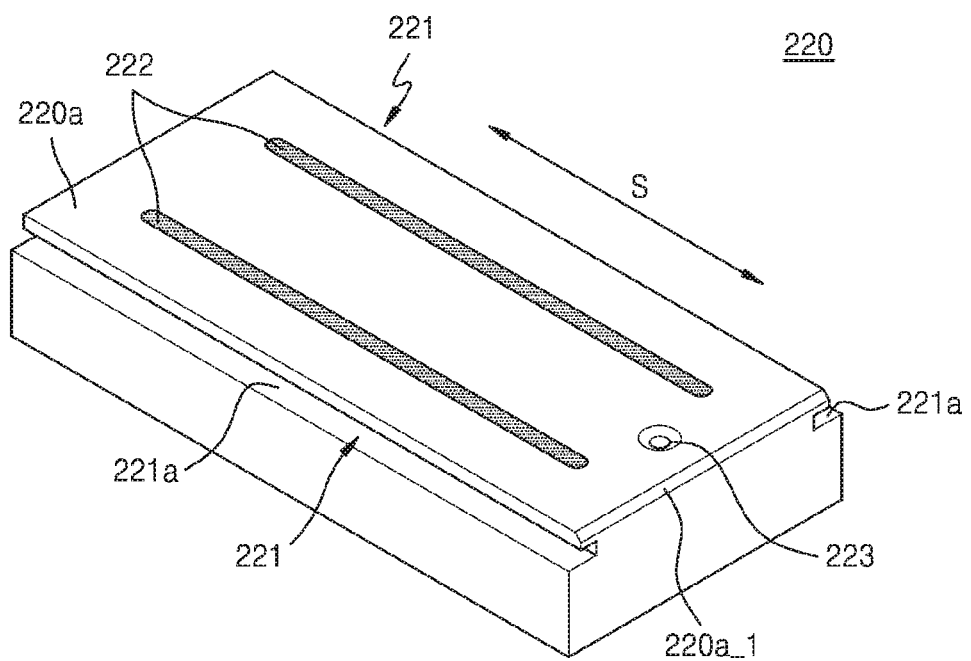
FIG. 23 is a schematic perspective view showing a battery mounting portion in a battery mounting assembly according to a modified example of an embodiment of the present disclosure, wherein a bottom surface of the battery mounting portion is turned over.

FIG. 21 is a schematic perspective view of a battery mounting assembly, in which the battery portion is mounted on the battery mounting portion, according to the modified example of the embodiment of the present disclosure, FIG. 22 is a schematic perspective view of the battery portion in the battery mounting assembly according to the modified example of the embodiment of the present disclosure, and FIG. 23 is a schematic perspective view of the battery mounting portion in the battery mounting assembly according to the modified example of the embodiment of the present disclosure, in a state where a bottom surface of the battery mounting portion is turned over.

The battery mounting assembly V2 according to the modified example of the present embodiment includes a battery portion 210 and a battery mounting portion 220, and the battery portion 210 is mounted on the battery mounting portion 220 as sliding towards the battery mounting portion 220.

As shown in FIGS. 21 and 22, the battery portion 210 includes a first guide 211, a first connection terminal 212, a fixing pin 213, a fixing pin retreat button 214, and a cam device 215.

The first guide 211 guides a sliding movement of the battery portion 210. The first guides 211 are arranged at opposite sides of the battery portion 210 and each of the first guides 211 includes guide flange 211a extending in the sliding direction S of the battery portion 210.

The guide flange 211a is inserted to a groove 221a of a second guide 221 to guide the sliding movement of the battery portion 210.

The first connection terminal 212 is arranged at a predetermined interval in the sliding direction S of the battery portion 210 and a direction R perpendicular to the sliding direction S. That is, six first connection terminals 212 are arranged, and when the supplied power is DC power, three first connection terminals 212 arranged along the sliding direction S function as positive electrodes and the other three function as negative electrodes, and the first connection terminals 212 are respectively connected to corresponding second connection terminals 222.

The first connection terminal 212 is elastically supported, and the structure of elastically supporting the first connection terminal 212 corresponds to the structure of arranging the second connection terminals 122 in the previous embodiment, and thus, detailed descriptions thereof are omitted.

The first connection terminal 212 includes an electrically conductive material, and is arranged so that the electric connection to the second connection terminal 222 may be maintained while replacing the battery portion 210. That is, a pair of the first connection terminals 212 are arranged in the sliding direction S with a predetermined distance D2 from another pair of the first connection terminals 212, and the another pair of the first connection terminals 212 are arranged with a predetermined distance D3 from the other pair of the first connection terminals 212 in the sliding direction S. As shown in FIG. 23, since the second connection terminals 222 are arranged in the sliding direction S, the electric connection between the first connection terminals 212 and the second connection terminals 222 may be maintained while replacing the battery portion 210.

In the battery portion 210 according to the modified example of the present embodiment, the fixing pin 213, the fixing pin retreat button 214, and the cam device 215 are nearly the same as the fixing pin 113, the fixing pin retreat button 114, and the cam device 115, and thus, detailed descriptions thereof are omitted here.

In addition, as shown in FIGS. 21 and 23, the battery mounting portion 220 includes the second guide 221, the second connection terminal 222, and the fixing hole 223.

The battery mounting portion 220 is installed on a device such as a mobile communication device, a robot, etc., to which the battery mounting assembly V2 is applied.

The second guide 221 guides the sliding movement of the battery portion 210. The second guides 211 are arranged at opposite sides of the battery mounting portion 220, and the second guide 221 includes the grooves 221a extending in the sliding direction S of the battery portion 210.

The second connection terminal 222 is arranged on a surface 220a of the battery mounting portion 220, wherein the surface 220a faces the battery portion 210, and is connected to the first connection terminal 212 of the battery portion 210.

The second connection terminal 222 extends in the sliding direction S of the battery portion 210. The second connection terminals 222 are arranged in two rows in parallel with each other, and when the supplied power is the DC power, the two rows respectively function as the positive electrode and the negative electrode.

The second connection terminal 222 includes an electrically conductive material, and the second connection terminal 222 is arranged to a sufficient length so that the electric connection to the first connection terminal 212 may be maintained even when the battery portion 210 is replaced as described later.

In addition, the fixing hole 223 is formed in the surface 220a of the battery mounting portion 220, wherein the surface 220a faces the battery portion 210, and the fixing pin 213 is inserted to the fixing hole 223 when the battery portion 210 is mounted.

When the fixing pin 213 is inserted to the fixing hole 223, the battery portion 210 may be stably fixed on the battery mounting portion 220.

Also, the battery mounting portion 220 includes a second inclined surface 220a_1 at a portion where the battery portion 210 slides to enter. The second inclined surface 220a_1 collides into the end portion of the fixing pin 213 when the battery portion 210 enters to be mounted, and at this time, the second inclined surface 220a_1 makes the fixing pin 213 retreat without generating shock and guides the sliding movement of the battery portion 210.

The battery portion 210 and the battery mounting portion 220 of the battery mounting assembly V2 according to the modified example of the present embodiment as described above may be applied to the battery replacement system 100, instead of the battery portion 110 and the battery mounting portion 120. That is, the battery portion 210 is placed and supported on the upper surface 130a of the battery supporter 130, and may be charged by the battery charger 140. In this case, a shape of the charging terminal 141 of the battery charger 140 needs to be modified to contact the first connection terminal 212 and stably charge the battery portion.

In the battery mounting assembly 200 according to the modified example of the present embodiment as described above, the power supply may be maintained when the battery portion 210 is replaced.

Also, the battery mounting assembly V2 according to the modified example of the embodiment may stably maintain the mounting state of the battery portion 210 when the replacing operation of the battery portion 210 is not performed, due to the fixing pin 213 of the battery portion 210 and the fixing hole 223 of the battery mounting portion 220.

In addition, in the battery mounting assembly V2 according to the modified example of the present embodiment, the replacing operation of the battery portion 210 may be easily performed and the automation of the replacing operation of the battery portion 210 may be easy due to the fixing pin retreat button 214 that operates the fixing pin 213. That is, the mounting state of the battery portion may be released only by placing a new battery portion to contact the existing battery portion and pushing the new battery portion in order to replace the battery portion 210, and thus, the battery portion may be easily replaced and transition to the automated process may be easily performed.

In addition to the above-described structure, operations, and effects, the structure, the operation, and the effects of the battery mounting assembly V2 according to the modified example of the present embodiment are the same as those of the battery mounting assembly V1 according to the above embodiment, and the detailed descriptions are omitted.

The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

INDUSTRIAL APPLICABILITY

The present disclosure may be applied to industries for manufacturing and utilizing the battery mounting assembly and the battery replacement system.

The invention claimed is:

1. A battery mounting assembly comprising:
a battery portion; and
a battery mounting portion on which the battery portion is mounted as sliding thereto,
wherein the battery portion comprises:
 a first guide configured to guide a sliding movement of the battery portion;
 a first connection terminal arranged on a first surface of the battery portion, the first surface of the battery portion facing the battery mounting portion;
 a fixing pin provided on the battery portion and configured to protrude from the battery portion or retract into the battery portion; and
 a fixing pin retreat button configured to control the fixing pin to protrude out of the battery portion or retract into the battery portion based on the fixing pin retreat button moving in a sliding direction of the battery portion,
wherein the battery mounting portion comprises:
 a second guide configured to guide the sliding movement of the battery portion with the first guide;
 a second connection terminal arranged on a second surface of the battery mounting portion, the second surface of the battery mounting portion facing the battery portion, and connected to the first connection terminal; and
 a fixing hole formed in the second surface of the battery mounting portion facing the battery portion, and into which the fixing pin is inserted.

2. The battery mounting assembly of claim 1, wherein:
the first connection terminal extends in the sliding direction of the battery portion, and
the second connection terminal is arranged in the sliding direction of the battery portion with a predetermined interval.

3. The battery mounting assembly of claim 2, wherein the second connection terminal is elastically supported.

4. The battery mounting assembly of claim 1, wherein:
the first connection terminal is arranged in the sliding direction of the battery portion with a predetermined interval, and
the second connection terminal extends in the sliding direction of the battery portion.

5. The battery mounting assembly of claim 4, wherein the first connection terminal is elastically supported.

6. The battery mounting assembly of claim 1, wherein the fixing pin and the fixing pin retreat button are connected via a cam device.

7. The battery mounting assembly of claim 6, wherein the cam device comprises:
a driving member connected to the fixing pin retreat button and including a cam recess;
a driven member connected to the fixing pin and including a protrusion inserted into the cam recess; and
an elastic member connected to the driving member and applying an elastic force to the fixing pin retreat button.

8. The battery mounting assembly of claim 1, wherein the first connection terminal and the second connection terminal are arranged to maintain electric connection between the first connection terminal and the second connection terminal during replacement of the battery portion.

9. The battery mounting assembly of claim 1, wherein the fixing pin has a first inclined surface at an end portion thereof.

10. The battery mounting assembly of claim 1, wherein the battery mounting portion has a second inclined surface at a part where the battery portion enters while sliding.

11. A battery replacement system comprising:
a battery portion;
a battery mounting portion provided on a vehicle, and on which the battery portion is slidably mounted;
a battery supporter arranged at an outer portion of the vehicle and supporting the battery portion; and
a battery charger configured to charge the battery portion supported by the battery supporter,
wherein the battery portion comprises:
 a first guide configured to guide a sliding movement of the battery portion;
 a first connection terminal arranged on a surface of the battery portion, wherein the surface faces the battery mounting portion;
 a fixing pin provided on the battery and configured to move in a first direction between a first position and a second position with respect to the battery portion; and
 a fixing pin retreat button configured to control the fixing pin to move between the first position and the second position based on the fixing pin retreat button being pushed in a second direction perpendicular to the first direction.

12. The battery replacement system of claim 11,
wherein the battery mounting portion comprises:
 a second guide configured to guide the sliding movement of the battery portion with the first guide;
 a second connection terminal arranged on a surface of the battery mounting portion, wherein the surface faces the battery portion, and connected to the first connection terminal; and
 a fixing hole formed in the surface of the battery mounting portion, wherein the surface faces the battery portion, so that the fixing pin is inserted thereto.

13. The battery replacement system of claim 12, wherein:
the first connection terminal extends in the second direction of the battery portion, and
the second connection terminal is arranged in the second direction of the battery portion with a predetermined interval.

14. The battery replacement system of claim 13, wherein the second connection terminal is elastically supported.

15. The battery replacement system of claim 12, wherein:
the first connection terminal is arranged in the second direction of the battery portion with a predetermined interval, and
the second connection terminal extends in the second direction of the battery portion.

16. The battery replacement system of claim 15, wherein the first connection terminal is elastically supported.

17. The battery replacement system of claim 12, wherein the fixing pin and the fixing pin retreat button are connected via a cam device.

18. The battery replacement system of claim 17, wherein the cam device comprises:
a driving member connected to the fixing pin retreat button and including a cam recess;
a driven member connected to the fixing pin and including a protrusion inserted to the cam recess; and
an elastic member connected to the driving member and applying an elastic force to the fixing pin retreat button.

19. The battery replacement system of claim 12, wherein the first connection terminal and the second connection terminal are arranged so that electric connection between the first connection terminal and the second connection terminal is maintained while the battery portion is replaced.

20. The battery replacement system of claim 12, wherein the fixing pin has a first inclined surface at an end portion thereof.

21. The battery replacement system of claim 12, wherein the battery mounting portion has a second inclined surface at a part where the battery portion enters while sliding.

22. The battery replacement system of claim 12, wherein the battery charger comprises:
a charging terminal connected to the first connection terminal of the battery portion;
an arm portion configured to support the charging terminal; and
an arm supporter configured to support the arm portion to be rotatable.

23. The battery replacement system of claim 22, wherein the battery charger further comprises an elastic portion elastically supporting the arm portion in a rotating direction with respect to the arm supporter.

24. The battery replacement system of claim 11, wherein:
the battery portion is arranged on the battery supporter while sliding, and
the battery supporter comprises a third guide configured to guide a sliding movement of the battery portion.

25. The battery replacement system of claim 11, wherein:
the battery portion is arranged on the battery supporter while sliding, and
the battery supporter comprises a motion stopper provided at a side thereof for restricting a sliding movement of the battery portion.

26. The battery mounting assembly of claim 1, wherein, based on the fixing pin retreat button moving toward the battery portion in the sliding direction of the battery portion, the fixing pin retracts into the battery portion.

27. The battery replacement system of claim 12, wherein, based on the fixing pin retreat button moving toward the battery portion in the second direction, the fixing pin retracts into the battery portion from the first position to the second position in the first direction.

* * * * *